(12) United States Patent
Thanasekaran

(10) Patent No.: US 11,301,333 B2
(45) Date of Patent: *Apr. 12, 2022

(54) INCREMENTALLY ACCUMULATING IN-PROCESS PERFORMANCE DATA AND HIERARCHICAL REPORTING THEREOF FOR A DATA STREAM IN A SECONDARY COPY OPERATION

(71) Applicant: Commvault Systems, Inc., Tinton Falls, NJ (US)

(72) Inventor: Vijayan Thanasekaran, Fremont, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 545 days.

This patent is subject to a terminal disclaimer.

(21) Appl. No.: 16/280,936

(22) Filed: Feb. 20, 2019

(65) Prior Publication Data

US 2019/0179715 A1 Jun. 13, 2019

Related U.S. Application Data

(63) Continuation of application No. 14/752,653, filed on Jun. 26, 2015, now Pat. No. 10,275,320.

(51) Int. Cl.
*G06F 11/14* (2006.01)
*H04L 69/22* (2022.01)
(Continued)

(52) U.S. Cl.
CPC ...... *G06F 11/1464* (2013.01); *G06F 11/1448* (2013.01); *H04L 43/08* (2013.01);
(Continued)

(58) Field of Classification Search
CPC ............ G06F 11/1464; G06F 11/1448
See application file for complete search history.

(56) References Cited

U.S. PATENT DOCUMENTS 4,686,620 A 8/1987 Ng
4,995,035 A 2/1991 Cole et al.
(Continued)

FOREIGN PATENT DOCUMENTS

EP 0259912 3/1988
EP 0405926 1/1991
(Continued)

OTHER PUBLICATIONS

"How to troubleshoot a handle leak?" from Yong Rhee's Microsoft Technet Blog at http://blogs.technet.microsoft.com/yongrhee/2011/12/19/how-to-troubleshoot-a-handle-leak/, retrieved on Dec. 8, 2017, in 23 pages.
(Continued)

*Primary Examiner* — Eliyah S. Harper
(74) *Attorney, Agent, or Firm* — Commvault Systems, Inc.

(57) ABSTRACT

Each data stream in a backup job is individually tracked by data agent(s) and media agent(s) in its path, generating performance data packets in-process and merging them into the processed data stream. The data stream thus incrementally accumulates performance data packets from any number of successive backup processes. The in-process tracking also captures hierarchical relationships among backup processes and in-process subtending tasks, so that the resulting performance report can depict parent and child operations. The hierarchical relationships are embedded into the performance data packets and may be analyzed by parsing the data stream. The media agent transfers the data packets belonging to the secondary copy to secondary storage. The media agent analyzes the performance data packets in the data stream and generates a performance report, which covers the data stream from source to destination, based on the accumulated information carried by the performance
(Continued)

data packets. The media agent illustratively stores the performance report locally as a flat file.

20 Claims, 17 Drawing Sheets

(51) Int. Cl.
  *H04L 43/08* (2022.01)
  *G06F 11/20* (2006.01)
(52) U.S. Cl.
  CPC .......... *H04L 69/22* (2013.01); *G06F 11/2056* (2013.01); *G06F 2201/80* (2013.01)

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,313,631 A | 5/1994 | Kao |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,561,825 A | 10/1996 | Yamagami et al. |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,956,716 A | 9/1999 | Kenner et al. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,058,066 A | 5/2000 | Norris et al. |
| 6,076,148 A | 6/2000 | Kedem et al. |
| 6,088,697 A | 7/2000 | Crockett et al. |
| 6,094,416 A | 7/2000 | Ying |
| 6,131,095 A | 10/2000 | Low et al. |
| 6,131,147 A | 10/2000 | Takagi |
| 6,131,190 A | 10/2000 | Sidwell |
| 6,148,412 A | 11/2000 | Cannon et al. |
| 6,154,787 A | 11/2000 | Urevig et al. |
| 6,157,963 A | 12/2000 | Courtright, III et al. |
| 6,161,111 A | 12/2000 | Mutalik et al. |
| 6,167,402 A | 12/2000 | Yeager |
| 6,209,059 B1 | 3/2001 | Ofer et al. |
| 6,212,512 B1 | 4/2001 | Barney et al. |
| 6,260,068 B1 | 7/2001 | Zalewski et al. |
| 6,260,069 B1 | 7/2001 | Anglin |
| 6,260,129 B1 | 7/2001 | Crockett et al. |
| 6,269,431 B1 | 7/2001 | Dunham |
| 6,272,386 B1 | 8/2001 | McLaughlin et al. |
| 6,275,953 B1 | 8/2001 | Vahalia et al. |
| 6,289,382 B1* | 9/2001 | Bowman-Amuah ........................ G06F 13/387 709/226 |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,385,706 B1 | 5/2002 | Ofek et al. |
| 6,389,432 B1 | 5/2002 | Pothapragada et al. |
| 6,389,559 B1 | 5/2002 | Sawdy et al. |
| 6,397,166 B1 | 5/2002 | Leung et al. |
| 6,414,985 B1 | 7/2002 | Furukawa et al. |
| 6,418,478 B1 | 7/2002 | Ignatius et al. |
| 6,421,711 B1 | 7/2002 | Blumenau et al. |
| 6,438,595 B1 | 8/2002 | Blumenau et al. |
| 6,466,950 B1 | 10/2002 | Ono |
| 6,487,561 B1 | 11/2002 | Ofek et al. |
| 6,516,314 B1 | 2/2003 | Birkler et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,542,468 B1 | 4/2003 | Hatakeyama |
| 6,542,972 B2 | 4/2003 | Ignatius et al. |
| 6,550,057 B1* | 4/2003 | Bowman-Amuah ... H04L 67/42 717/126 |
| 6,564,228 B1 | 5/2003 | O'Connor |
| 6,571,282 B1* | 5/2003 | Bowman-Amuah ........................ H04L 67/303 709/219 |
| 6,587,970 B1 | 7/2003 | Wang et al. |
| 6,594,698 B1 | 7/2003 | Chow et al. |
| 6,604,118 B2 | 8/2003 | Kleinman et al. |
| 6,611,849 B1 | 8/2003 | Raff et al. |
| 6,615,253 B1* | 9/2003 | Bowman-Amuah ........................ G06F 16/9574 709/219 |
| 6,629,189 B1 | 9/2003 | Sandstrom |
| 6,640,244 B1* | 10/2003 | Bowman-Amuah ... G06F 9/466 707/999.01 |
| 6,640,249 B1* | 10/2003 | Bowman-Amuah ..... G06F 8/36 709/228 |
| 6,643,801 B1 | 11/2003 | Jammu et al. |
| 6,658,436 B2 | 12/2003 | Oshinsky et al. |
| 6,658,526 B2 | 12/2003 | Nguyen et al. |
| 6,658,652 B1 | 12/2003 | Alexander, III et al. |
| 6,671,818 B1 | 12/2003 | Mikurak |
| 6,691,209 B1 | 2/2004 | O'Connell |
| 6,732,124 B1 | 5/2004 | Koseki et al. |
| 6,771,595 B1 | 8/2004 | Gilbert et al. |
| 6,792,472 B1 | 9/2004 | Otterness et al. |
| 6,820,035 B1 | 11/2004 | Zahavi |
| 6,823,507 B1 | 11/2004 | Srinivasan et al. |
| 6,839,724 B2 | 1/2005 | Manchanda et al. |
| 6,925,476 B1 | 8/2005 | Multer et al. |
| 6,952,737 B1 | 10/2005 | Coates et al. |
| 7,035,880 B1 | 4/2006 | Crescenti et al. |
| 7,065,615 B2 | 6/2006 | Sugino et al. |
| 7,068,597 B1 | 6/2006 | Fijolek et al. |
| 7,082,441 B1 | 7/2006 | Zahavi et al. |
| 7,085,904 B2 | 8/2006 | Mizuno et al. |
| 7,089,281 B1 | 8/2006 | Kazemi et al. |
| 7,093,012 B2 | 8/2006 | Olstad et al. |
| 7,093,089 B2 | 8/2006 | de Brebisson |
| 7,096,269 B2 | 8/2006 | Yamagami |

(56) References Cited

U.S. PATENT DOCUMENTS

| | | | |
|---|---|---|---|
| 7,096,315 B2 | 8/2006 | Takeda et al. | |
| 7,103,740 B1 | 9/2006 | Colgrove et al. | |
| 7,106,691 B1 | 9/2006 | Decaluwe et al. | |
| 7,120,757 B2 | 10/2006 | Tsuge | |
| 7,130,970 B2 | 10/2006 | Devassy et al. | |
| 7,146,377 B2 | 12/2006 | Nowicki et al. | |
| 7,158,985 B1 | 1/2007 | Liskov | |
| 7,197,490 B1 | 3/2007 | English | |
| 7,203,944 B1 | 4/2007 | van Rietschote et al. | |
| 7,216,244 B2 | 5/2007 | Amano | |
| 7,231,391 B2 | 6/2007 | Aronoff | |
| 7,289,964 B1 * | 10/2007 | Bowman-Amuah | G06F 9/5038 705/1.1 |
| 7,292,969 B1 | 11/2007 | Aharoni et al. | |
| 7,315,923 B2 | 1/2008 | Retnamma et al. | |
| 7,340,652 B2 | 3/2008 | Jarvis et al. | |
| 7,343,356 B2 | 3/2008 | Prahlad et al. | |
| 7,343,453 B2 | 3/2008 | Prahlad et al. | |
| 7,343,459 B2 | 3/2008 | Prahlad et al. | |
| 7,346,623 B2 | 3/2008 | Prahlad et al. | |
| 7,346,751 B2 | 3/2008 | Prahlad et al. | |
| 7,373,364 B1 | 5/2008 | Chapman | |
| 7,380,039 B2 | 5/2008 | Miloushev et al. | |
| 7,395,282 B1 | 7/2008 | Crescenti et al. | |
| 7,401,064 B1 | 7/2008 | Arone et al. | |
| 7,454,569 B2 | 11/2008 | Kavuri et al. | |
| 7,461,101 B2 | 12/2008 | Hsu et al. | |
| 7,461,230 B1 | 12/2008 | Gupta et al. | |
| 7,469,262 B2 | 12/2008 | Baskaran et al. | |
| 7,472,312 B2 | 12/2008 | Jarvis et al. | |
| 7,490,207 B2 | 2/2009 | Amarendran et al. | |
| 7,502,902 B2 | 3/2009 | Sato et al. | |
| 7,529,745 B2 | 5/2009 | Ahluwalia et al. | |
| 7,529,827 B2 | 5/2009 | Devraj et al. | |
| 7,533,181 B2 | 5/2009 | Dawson et al. | |
| 7,536,291 B1 | 5/2009 | Vijayan Retnamma et al. | |
| 7,536,693 B1 | 5/2009 | Manczak et al. | |
| 7,546,354 B1 | 6/2009 | Fan et al. | |
| 7,546,364 B2 | 6/2009 | Raman et al. | |
| 7,617,262 B2 | 11/2009 | Prahlad et al. | |
| 7,617,321 B2 | 11/2009 | Clark | |
| 7,644,245 B2 | 1/2010 | Prahlad et al. | |
| 7,721,202 B2 | 5/2010 | Fuchs et al. | |
| 7,734,669 B2 | 6/2010 | Kottomtharayil et al. | |
| 7,765,167 B2 | 7/2010 | Prahlad et al. | |
| 7,769,734 B2 | 8/2010 | Lyons | |
| 7,788,127 B1 | 8/2010 | Gilgur et al. | |
| 7,831,566 B2 | 11/2010 | Kavuri et al. | |
| 7,904,681 B1 | 3/2011 | Bappe | |
| 8,112,605 B2 | 2/2012 | Kavuri | |
| 8,185,502 B2 | 5/2012 | Irisawa et al. | |
| 8,266,406 B2 | 9/2012 | Kavuri | |
| 8,285,681 B2 | 10/2012 | Prahlad et al. | |
| 8,306,926 B2 | 11/2012 | Prahlad et al. | |
| 8,307,177 B2 | 11/2012 | Prahlad et al. | |
| 8,335,776 B2 | 12/2012 | Gokhale | |
| 8,364,652 B2 | 1/2013 | Vijayan et al. | |
| 8,578,120 B2 | 11/2013 | Attarde et al. | |
| 8,661,216 B2 | 2/2014 | Kavuri et al. | |
| 8,700,875 B1 | 4/2014 | Barron et al. | |
| 8,706,993 B2 | 4/2014 | Prahlad et al. | |
| 8,725,980 B2 | 5/2014 | Kavuri | |
| 8,751,463 B1 | 6/2014 | Chamness et al. | |
| 8,935,493 B1 | 1/2015 | Dolan et al. | |
| 8,954,446 B2 | 2/2015 | Retnamma et al. | |
| 9,020,900 B2 | 4/2015 | Retnamma et al. | |
| 9,021,200 B1 | 4/2015 | Kushmerick | |
| 9,026,718 B2 | 5/2015 | Rabeler et al. | |
| 9,098,495 B2 | 8/2015 | Gokhale | |
| 9,111,220 B2 | 8/2015 | Prahlad et al. | |
| 9,152,685 B2 | 10/2015 | Kavuri et al. | |
| 9,158,653 B2 | 10/2015 | Gold | |
| 9,164,692 B2 | 10/2015 | Kavuri | |
| 9,235,535 B1 | 1/2016 | Shim et al. | |
| 9,239,687 B2 | 1/2016 | Vijayan et al. | |
| 9,405,471 B2 | 8/2016 | Prahlad et al. | |
| 9,448,892 B2 | 9/2016 | Kavuri et al. | |
| 9,519,432 B1 | 12/2016 | Haustein et al. | |
| 9,589,029 B2 | 3/2017 | Choudhary et al. | |
| 9,830,223 B1 | 11/2017 | Holenstein et al. | |
| 9,916,111 B2 | 3/2018 | Kavuri et al. | |
| 9,990,196 B2 | 6/2018 | Ben-Dayan Rubin et al. | |
| 10,013,170 B1 | 7/2018 | Sahin et al. | |
| 10,133,507 B2 | 11/2018 | Kavuri et al. | |
| 10,176,036 B2 | 1/2019 | Haridas et al. | |
| 10,248,494 B2 | 4/2019 | Haridas et al. | |
| 10,275,320 B2 * | 4/2019 | Thanasekaran | G06F 11/3409 |
| 10,282,113 B2 | 5/2019 | Prahlad et al. | |
| 10,379,988 B2 | 8/2019 | Kochunni et al. | |
| 10,452,444 B1 | 10/2019 | Jibaja et al. | |
| 10,564,870 B1 | 2/2020 | Greenwood et al. | |
| 10,684,924 B2 | 6/2020 | Kilaru et al. | |
| 10,831,591 B2 | 11/2020 | Upadhyay | |
| 10,901,615 B2 | 1/2021 | Prahlad et al. | |
| 11,132,139 B2 | 9/2021 | Kavuri et al. | |
| 2001/0034795 A1 | 10/2001 | Moulton et al. | |
| 2001/0044879 A1 | 11/2001 | Moulton et al. | |
| 2001/0047400 A1 | 11/2001 | Coates et al. | |
| 2002/0019909 A1 | 2/2002 | D'Errico | |
| 2002/0065919 A1 | 5/2002 | Taylor et al. | |
| 2002/0120741 A1 | 8/2002 | Webb et al. | |
| 2002/0124137 A1 | 9/2002 | Ulrich et al. | |
| 2002/0129216 A1 | 9/2002 | Collins | |
| 2002/0143999 A1 | 10/2002 | Yamagami | |
| 2002/0181395 A1 | 12/2002 | Foster et al. | |
| 2002/0194526 A1 | 12/2002 | Ulrich et al. | |
| 2003/0005119 A1 | 1/2003 | Mercier et al. | |
| 2003/0023743 A1 | 1/2003 | Raphel et al. | |
| 2003/0023893 A1 | 1/2003 | Lee et al. | |
| 2003/0035419 A1 | 2/2003 | Chin et al. | |
| 2003/0037061 A1 | 2/2003 | Sastri et al. | |
| 2003/0058277 A1 * | 3/2003 | Bowman-Amuah | G06F 16/289 715/765 |
| 2003/0061456 A1 | 3/2003 | Ofek et al. | |
| 2003/0065759 A1 | 4/2003 | Britt et al. | |
| 2003/0079018 A1 | 4/2003 | Lolayekar et al. | |
| 2003/0126200 A1 | 7/2003 | Wolff | |
| 2003/0145086 A1 | 7/2003 | O'Reilly | |
| 2003/0161338 A1 | 8/2003 | Ng et al. | |
| 2003/0167380 A1 | 9/2003 | Green et al. | |
| 2003/0188119 A1 | 10/2003 | Lubbers et al. | |
| 2003/0212859 A1 | 11/2003 | Ellis et al. | |
| 2003/0225800 A1 | 12/2003 | Kavuri | |
| 2004/0006572 A1 | 1/2004 | Hoshino et al. | |
| 2004/0006578 A1 | 1/2004 | Yu | |
| 2004/0010487 A1 | 1/2004 | Prahlad et al. | |
| 2004/0078632 A1 | 4/2004 | Infante et al. | |
| 2004/0117438 A1 | 6/2004 | Considine et al. | |
| 2004/0122917 A1 | 6/2004 | Menon et al. | |
| 2004/0128363 A1 | 7/2004 | Yamagami | |
| 2004/0133634 A1 | 7/2004 | Luke | |
| 2004/0153481 A1 | 8/2004 | Talluri | |
| 2004/0181632 A1 | 9/2004 | Factor et al. | |
| 2004/0193625 A1 | 9/2004 | Sutoh | |
| 2004/0199734 A1 | 10/2004 | Rajamani et al. | |
| 2004/0225437 A1 | 11/2004 | Endo et al. | |
| 2004/0230862 A1 | 11/2004 | Merchant et al. | |
| 2004/0249972 A1 | 12/2004 | White et al. | |
| 2004/0250033 A1 | 12/2004 | Prahlad et al. | |
| 2004/0267839 A1 | 12/2004 | Mendonca et al. | |
| 2005/0010732 A1 | 1/2005 | Boyd et al. | |
| 2005/0010843 A1 | 1/2005 | Iwamitsu et al. | |
| 2005/0015554 A1 | 1/2005 | Zohar et al. | |
| 2005/0015624 A1 * | 1/2005 | Ginter | H04L 63/20 726/4 |
| 2005/0021591 A1 | 1/2005 | Boyd et al. | |
| 2005/0033756 A1 | 2/2005 | Kottomtharayil et al. | |
| 2005/0044114 A1 | 2/2005 | Kottomtharayil et al. | |
| 2005/0050271 A1 | 3/2005 | Honda et al. | |
| 2005/0060613 A1 | 3/2005 | Cheng | |
| 2005/0076184 A1 | 4/2005 | Schumacher | |
| 2005/0091311 A1 | 4/2005 | Lund et al. | |

(56) References Cited

U.S. PATENT DOCUMENTS

| | | |
|---|---|---|
| 2005/0091646 A1 | 4/2005 | Chilimbi et al. |
| 2005/0097283 A1 | 5/2005 | Karlsson et al. |
| 2005/0108247 A1 | 5/2005 | Heinla et al. |
| 2005/0114562 A1 | 5/2005 | Barnes et al. |
| 2005/0114728 A1 | 5/2005 | Aizawa et al. |
| 2005/0120093 A1 | 6/2005 | Nakano et al. |
| 2005/0172073 A1 | 8/2005 | Voigt |
| 2005/0174869 A1 | 8/2005 | Kottomtharayil et al. |
| 2005/0188109 A1 | 8/2005 | Shiga et al. |
| 2005/0188253 A1 | 8/2005 | Kawamura et al. |
| 2005/0188263 A1 | 8/2005 | Gross et al. |
| 2005/0198455 A1 | 9/2005 | Yagawa |
| 2005/0210321 A1 | 9/2005 | Bai et al. |
| 2005/0228875 A1 | 10/2005 | Monitzer et al. |
| 2005/0243611 A1 | 11/2005 | Lubbers et al. |
| 2005/0246376 A1 | 11/2005 | Lu et al. |
| 2005/0254456 A1 | 11/2005 | Sakai |
| 2005/0257062 A1 | 11/2005 | Ignatius et al. |
| 2005/0268068 A1 | 12/2005 | Ignatius et al. |
| 2005/0278394 A1 | 12/2005 | Oks et al. |
| 2006/0005074 A1 | 1/2006 | Yanai et al. |
| 2006/0010341 A1 | 1/2006 | Kodama |
| 2006/0031594 A1 | 2/2006 | Kodama |
| 2006/0047931 A1 | 3/2006 | Sakai |
| 2006/0092861 A1 | 5/2006 | Corday et al. |
| 2006/0107089 A1 | 5/2006 | Jansz et al. |
| 2006/0171315 A1 | 8/2006 | Choi et al. |
| 2006/0174075 A1 | 8/2006 | Sutoh |
| 2006/0206662 A1 | 9/2006 | Ludwig et al. |
| 2006/0215564 A1 | 9/2006 | Breitgand et al. |
| 2006/0285523 A1 | 12/2006 | Ishii et al. |
| 2007/0033368 A1 | 2/2007 | Taguchi et al. |
| 2007/0033437 A1 | 2/2007 | Kawamura |
| 2007/0050547 A1 | 3/2007 | Sano |
| 2007/0050686 A1 | 3/2007 | Keeton et al. |
| 2007/0055737 A1 | 3/2007 | Yamashita et al. |
| 2007/0067586 A1 | 3/2007 | Mikami |
| 2007/0088702 A1 | 4/2007 | Fridella et al. |
| 2007/0130373 A1 | 6/2007 | Kalwitz |
| 2007/0136402 A1 | 6/2007 | Grose et al. |
| 2007/0198802 A1 | 8/2007 | Kavuri |
| 2007/0226535 A1 | 9/2007 | Gokhale |
| 2007/0260609 A1 | 11/2007 | Tulyani |
| 2007/0260834 A1 | 11/2007 | Kavuri et al. |
| 2007/0271570 A1 | 11/2007 | Brown et al. |
| 2008/0033991 A1 | 2/2008 | Basak et al. |
| 2008/0059704 A1 | 3/2008 | Kavuri |
| 2008/0091738 A1 | 4/2008 | Devraj et al. |
| 2008/0114815 A1 | 5/2008 | Sutoh |
| 2008/0126704 A1 | 5/2008 | Ulrich et al. |
| 2008/0147878 A1 | 6/2008 | Kottomtharayil et al. |
| 2008/0177694 A1 | 7/2008 | Chaudhuri et al. |
| 2008/0177970 A1 | 7/2008 | Prahlad et al. |
| 2008/0177971 A1 | 7/2008 | Prahlad et al. |
| 2008/0205301 A1 | 8/2008 | Burton et al. |
| 2008/0228987 A1 | 9/2008 | Yagi |
| 2008/0250178 A1 | 10/2008 | Haustein et al. |
| 2008/0301504 A1 | 12/2008 | Chen et al. |
| 2008/0313497 A1 | 12/2008 | Hirakawa |
| 2009/0013014 A1 | 1/2009 | Kern |
| 2009/0037585 A1 | 2/2009 | Miloushev et al. |
| 2009/0089499 A1 | 4/2009 | Abe |
| 2009/0113056 A1 | 4/2009 | Tameshige et al. |
| 2009/0164698 A1 | 6/2009 | Ji et al. |
| 2009/0271504 A1* | 10/2009 | Ginter ................ H04L 41/0806 709/220 |
| 2009/0300412 A1 | 12/2009 | Soran et al. |
| 2009/0327854 A1 | 12/2009 | Chhajer et al. |
| 2010/0010968 A1* | 1/2010 | Redlich ................ G06Q 10/00 707/E17.014 |
| 2010/0058012 A1 | 3/2010 | Okada et al. |
| 2010/0070726 A1 | 3/2010 | Namikawa et al. |
| 2010/0138391 A1 | 6/2010 | Namikawa et al. |
| 2010/0293112 A1 | 11/2010 | Namikawa et al. |
| 2010/0312979 A1 | 12/2010 | Kavuri et al. |
| 2011/0010518 A1 | 1/2011 | Kavuri et al. |
| 2011/0082837 A1 | 4/2011 | Cherkasova et al. |
| 2011/0202504 A1 | 8/2011 | Cherkasova et al. |
| 2011/0219035 A1* | 9/2011 | Korsunsky ............. G06F 21/00 707/784 |
| 2011/0295811 A1 | 12/2011 | Cherkasova et al. |
| 2012/0042122 A1 | 2/2012 | Beniyama et al. |
| 2012/0069131 A1* | 3/2012 | Abelow ............... G06Q 10/067 348/14.01 |
| 2012/0078846 A1 | 3/2012 | Gold et al. |
| 2012/0084501 A1 | 4/2012 | Watanabe et al. |
| 2012/0191900 A1 | 7/2012 | Kunimatsu et al. |
| 2012/0233417 A1 | 9/2012 | Kalach et al. |
| 2012/0297156 A1 | 11/2012 | Suzuki et al. |
| 2013/0054539 A1 | 2/2013 | Kaldas et al. |
| 2013/0124734 A1 | 5/2013 | Kavuri |
| 2013/0191681 A1 | 7/2013 | Moiseev et al. |
| 2013/0346709 A1 | 12/2013 | Wang |
| 2014/0019807 A1 | 1/2014 | Harrison et al. |
| 2014/0040573 A1 | 2/2014 | Cherkasova et al. |
| 2014/0101093 A1* | 4/2014 | Lanphear ............. G06F 16/254 707/602 |
| 2014/0180664 A1* | 6/2014 | Kochunni ........... G06F 11/3442 703/21 |
| 2014/0201170 A1 | 7/2014 | Vijayan et al. |
| 2015/0261832 A1 | 9/2015 | Sinha et al. |
| 2015/0278329 A1 | 10/2015 | Hrle et al. |
| 2015/0304709 A1 | 10/2015 | Zhang et al. |
| 2016/0350391 A1* | 12/2016 | Vijayan ................ G06F 3/0619 |
| 2016/0353172 A1* | 12/2016 | Miller .................. G06F 3/0488 |
| 2016/0357789 A1 | 12/2016 | Contessa et al. |
| 2016/0371180 A1 | 12/2016 | Urmanov et al. |
| 2016/0378614 A1 | 12/2016 | Thanasekaran |
| 2017/0168903 A1 | 6/2017 | Dornemann et al. |
| 2017/0185488 A1 | 6/2017 | Kumarasamy et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0308449 A1 | 10/2017 | Mangione-Tran et al. |
| 2017/0357553 A1 | 12/2017 | Zhao et al. |
| 2018/0165033 A1 | 6/2018 | Baig et al. |
| 2018/0373443 A9 | 12/2018 | Prahlad et al. |
| 2019/0095272 A1 | 3/2019 | Haridas et al. |
| 2019/0121673 A1 | 4/2019 | Gold et al. |
| 2019/0278498 A1 | 9/2019 | Dedrick |
| 2019/0356609 A1 | 11/2019 | Grunwald et al. |
| 2020/0034745 A1 | 1/2020 | Nagpal et al. |
| 2020/0192572 A1 | 6/2020 | Dwarampudi et al. |
| 2020/0233589 A1 | 7/2020 | Prahlad et al. |
| 2020/0264966 A1 | 8/2020 | Kochunni et al. |
| 2020/0319956 A1 | 10/2020 | Upadhyay |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO 1995-013580 | 5/1995 |
| WO | WO 1999-012098 | 3/1999 |

OTHER PUBLICATIONS

"Windows Leaks Detector" from http://winleak.sourceforge.net/, retrieved on Oct. 10, 2017, in 3 pages.

U.S. Appl. No. 13/606,371, filed Sep. 7, 2012, Kavuri.

Armstead et al., "Implementation of a Campus-Wide Distributed Mass Storage Service: The Dream vs. Reality," IEEE, 1995, pp. 190-199.

Arneson, "Mass Storage Archiving in Network Environments" IEEE, 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

(56) References Cited

OTHER PUBLICATIONS

Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
Jander, "Launching Storage-Area Net," Data Communications, US, McGraw Hill, NY, vol. 27, No. 4(Mar. 21, 1998), pp. 64-72.
Rosenblum et al., "The Design and Implementation of a Log-Structure File System," Operating Systems Review SIGOPS, vol. 25, No. 5, New York, US, pp. 1-15 (May 1991).
European Examination Report Application No. 05745272.4, dated Jun. 28, 2010.
International Search Report, PCT-US2005-015202, dated Dec. 5, 2006.
Supplementary European Search Report, EP 05745272.2, dated Mar. 16, 2010, 3 pages.
Office Action in Canadian Application No. 2,564,967 dated Aug. 8, 2012.
Office Action in European Application No. 05745272.4 dated Sep. 9, 2015.

\* cited by examiner

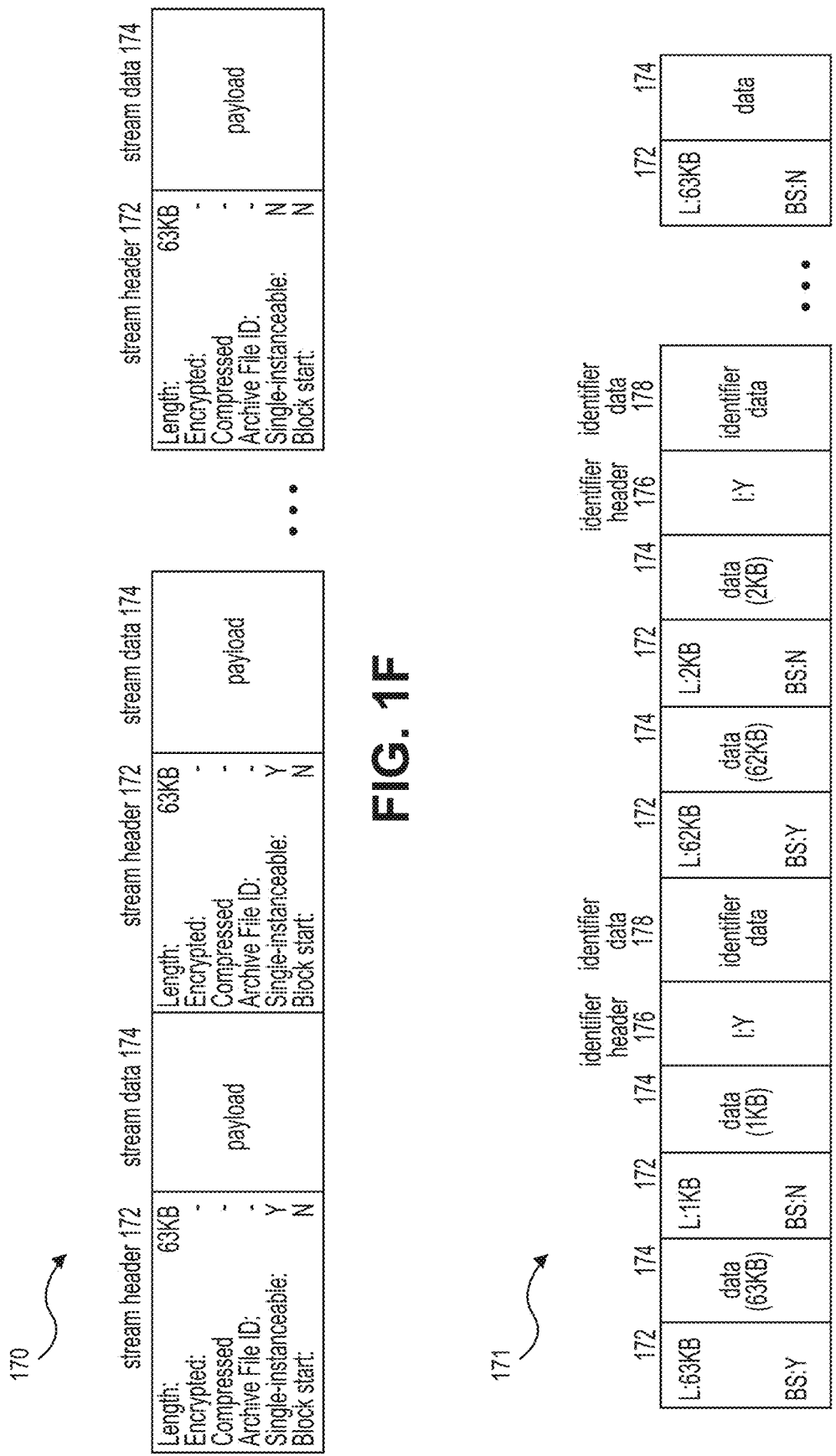

```
                    ┌─ 901 Backup Job ID   ┌─ 902 Data Stream ID
Job-ID: 6              [Pipe-ID: 2] ◄── 903 ID Of Primary Data Source 112
Stream Source:    CLDEDUPTEST2_cn
Simpana Network Medium:   Unknown
Head Duration (Local):  [26,2,15 01:41:22  ~  26,2,15 05:48:44] 04:07:22 (14842)
Tail Duration (Local):  [26,2,15 01:41:22  ~  26,2,15 05:48:44] 04:07:22 (14842)
-------------------------------------------------------------------------------
   Perf-Counters ◄── 904          905 ──► Time(seconds)    Size ◄── 906
-------------------------- 907 Data Agent Reader 341 --------------------------
Windows File System Agent
 |_Buffer Allocation......................    8333
 |_Read..................................    1856       159513984990
 |_Pipeline Write........................    4414       159604132875
 |_FSDM Load Library.....................      28
 |_Media Open............................       -

Reader Pipeline Modules
 |_SDT: Head.............................    2057       160101527258  ┐
 |_SDT-Head: Compression.................   14195       160101469722  │
 |_SDT-Head: Signature Module............   14559       149495562760  │
    |_SDT-Head: Signature Compute........    2252       148888811988  │
       |_Src-side Dedup..................   12265                     │
          |_Buffer Allocation............   11554                     │
          |_Passing To Next Module.......      39                     │
          |_Sig-lookup...................     395                     │
             |_SIDB-Lookup................     386                    ├─ 911
                |_SIDB:CL-QueryInsert[CLDEDUPTEST1_cn]  339            │  Hierarch.
          |_Source Side Dedupe Stats.....       -                     │
             |_[Signature Processed].....                   696930    │
             |_[New Signatures]..........                   683824    │
             |_[Signatures Found In DDB].                    13106    │
             |_[Application Data Size]...              159332705047   │
             |_[Processed Data Size].....              148845301254   │
             |_[New Data Size]...........              146369915172   │
             |_[Dropped Data Size (percent[1.66])].      2475386082   │
             |_[Non-dedupable Data Size].                598610514    │
 |_SDT-Head: Network Transfer............    6527       147224854544  ┘

Writer Pipeline Modules  ┌─ 912 Media Agent Network Receive 441
 |_SDT-Tail: Network.....................   14653       147224912216
 |_SDT-Tail: End.........................    2458       147224854544
 |_DSBackup: Update Restart Info.........      11
 |_DSBackup: Update Indexr...............       7
 |_DSBackup: Update Restart Info Index...       -
 |_DSBackup: Media Write.................    2412       147077324040
    |_SIDB:CommitAndUpdateRecs[CLDEDUPTEST1_cn].  71
-------------------------------------------------------------------------------
         913 Media Agent Media Writer 444 ─┘
```

FIG. 9   Sample Performance Report 468 For An Illustrative Data Stream 2 In Backup Job 6

```
|*34*|*Perf*|53| Job-ID: 53          [Pipe-ID: 34]         [App-Type: 43]                  [Data-Type: 1]
|*34*|*Perf*|53| Stream Source:   CLDEDUPTEST2
|*34*|*Perf*|53| Simpana Network medium:   SDT
|*34*|*Perf*|53| Head duration (Local):   [05,June,15 09:43:44]  -  05,June,15 12:22:04]  02:38:20 (9500)
|*34*|*Perf*|53| Tail duration (Local):   [05,June,15 09:43:43]  -  05,June,15 12:22:03]  02:38:20 (9500)
|*34*|*Perf*|53| -----------------------------------------------------------------------------------------
|*34*|*Perf*|53|       Perf-Counter                       Time(seconds)       Size
|*34*|*Perf*|53| -----------------------------------------------------------------------------------------
|*34*|*Perf*|53| Windows File System Agent
|*34*|*Perf*|53| |_Buffer allocation.........................    4935
|*34*|*Perf*|53| |_Read......................................    1894         159515013456    [148.56 GB]  [282.37 GBPH]
|*34*|*Perf*|53| |_Pipeline write............................    2575         159605164115    [148.64 GB]  [207.81 GBPH]
|*34*|*Perf*|53| |_Open File.................................      27
|*34*|*Perf*|53| |_FSDM Load Library.........................       -
|*34*|*Perf*|53|
|*34*|*Perf*|53| Reader Pipeline Modules
|*34*|*Perf*|53| |_SDT: Head.................................    2094         160102561454    [149.11 GB]  [Samples -
4088316] [Avg - 0.000512] [256.34 GBPH]
|*34*|*Perf*|53| |_SDT-Head: Compression.....................   14609         160102503918    [149.11 GB]  [Samples -
4088315] [Avg - 0.003573] [36.74 GBPH]
|*34*|*Perf*|53| |_SDT-Head: Signature module................    9315         149495584344    [139.23 GB]  [Samples -
4088315] [Avg - 0.002278] [53.81 GBPH]
|*34*|*Perf*|53| |_SDT-Head: Signature Compute...............    2297         148888827525    [138.66 GB]  [217.32 GBPH]
|*34*|*Perf*|53| |_Src-side Dedup............................    6970
|*34*|*Perf*|53|     |_Buffer allocation.....................    6377
|*34*|*Perf*|53|     |_Passing to next module................      42
|*34*|*Perf*|53|     |_Sig-lookup............................     228                                      [Samples - 696931] [Avg -
0.000306]
|*34*|*Perf*|53|         |_SIDB-Lookup.......................     213
|*34*|*Perf*|53|             |_SIDB:CL-QueryInsert[CLDEDUPTEST1]...  166         ← 1010 Data Agent Dedupe Stats
|*34*|*Perf*|53|     |_Source Side Dedupe stats..............       -
|*34*|*Perf*|53|         |_[Signature Processed].............       -           696931          [680.60 KB]
|*34*|*Perf*|53|         |_[New Signatures]..................       -           683828          [667.80 KB]
|*34*|*Perf*|53|         |_[Signatures Found in DDB].........       -            13103          [12.80 KB]
|*34*|*Perf*|53|         |_[Application Data size]...........       -        159333732220       [148.39 GB]
|*34*|*Perf*|53|         |_[Processed Data size].............       -        148845316364       [138.62 GB]
|*34*|*Perf*|53|         |_[New Data size]...................       -        146370542682       [136.32 GB]
|*34*|*Perf*|53|         |_[Dropped Data size (percent[1.66])].      -          2474773682       [2.30 GB]
|*34*|*Perf*|53|         |_[Non-dedupable data size].........       -           598615732       [570.88 MB]
|*34*|*Perf*|53| |_SDT-Head: CRC32 update....................       6         147225490032      [137.11 GB]  [Samples -
3502363] [Avg - 0.000002] [82268.65 GBPH]
```

FIG. 10 Sample Performance Report 468 (Partial) For An Illustrative Data Stream 34 In Backup Job 53

```
|*34*|*Perf*|53|  ===============================================================================
|*34*|*Perf*|53|  Job-ID: 53           [Pipe-ID: 34]         [App-Type: 43]         [Data-Type: 1]
|*34*|*Perf*|53|  Stream Source:   CLDEDUPTEST2
|*34*|*Perf*|53|  Simpana Network medium:    SDT
|*34*|*Perf*|53|  Head duration (Local):    [05,June,15 09:43:44] - 05,June,15 12:22:04] 02:38:20 (9500)
|*34*|*Perf*|53|  Tail duration (Local):    [05,June,15 09:43:43] - 05,June,15 12:22:03] 02:38:20 (9500)
|*34*|*Perf*|53|  -------------------------------------------------------------------------------
|*34*|*Perf*|53|       Perf-Counter                              Time(seconds)      Size
|*34*|*Perf*|53|  -------------------------------------------------------------------------------
|*34*|*Perf*|53|  |_SDT-Head: Network transfer......       ← 1101 Data Agent Network Sender 346
3502363] [Avg - 0.0001151] [1931.34 GBPH]                      530       1472225490032  [137.11 GB]  [Samples -
|*34*|*Perf*|53|  Writer Pipeline Modules      ← 1102 Media Agent Backup Processes
|*34*|*Perf*|53|  |_SDT-Tail: Network......                     9369      1472225547704  [137.11 GB]  [Samples -
3502365] [Avg - 0.002675] [152.69 GBPH]
|*34*|*Perf*|53|  |_SDT-Tail: End......                          477      1472225490032  [137.11 GB]  [Samples -
3502363] [Avg - 0.0001361] [1034.83 GBPH]
|*34*|*Perf*|53|  |_DSBackup: Update Restart Info......            7
|*34*|*Perf*|53|  |_DSBackup: Update Index......                   6
|*34*|*Perf*|53|  |_DSBackup: Update Restart Info Index......      -
|*34*|*Perf*|53|  |_DSBackup: Media Write......                  406      1470779586679  [136.98 GB]  [1214.57 GBPH]
|*34*|*Perf*|53|    |_SIDB:CommitAndUpdateRecs[CLDEDUPTEST1]...   73      1471192798786  [137.08 GB]  [2920.13 GBPH]
|*34*|*Perf*|53|    |_Disk Write......                           169          ↑
|*34*|*Perf*|53|                                            1103 Media Agent Media Writer 444
|*34*|*Perf*|53|
```

FIG. 11  Sample Performance Report 468 (Partial) For An Illustrative Data Stream 34 In Backup Job 53

INCREMENTALLY ACCUMULATING IN-PROCESS PERFORMANCE DATA AND HIERARCHICAL REPORTING THEREOF FOR A DATA STREAM IN A SECONDARY COPY OPERATION

INCORPORATION BY REFERENCE TO ANY PRIORITY APPLICATIONS

Any and all applications, if any, for which a foreign or domestic priority claim is identified in the Application Data Sheet of the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses worldwide recognize the commercial value of their data and seek reliable, cost-effective ways to protect the information stored on their computer networks while minimizing impact on productivity. A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth. Given the rapidly expanding volume of data under management, companies also seek innovative techniques for performance analysis and reporting of data management operations to better characterize their storage management systems and continually improve them.

SUMMARY

Performance analysis and reporting in a multi-component storage management system are both critically important and also present a number of challenges. Traditional approaches tend to report on the performance of individual components of the storage management system, such as storage manager, data agent, and media agent. Storage management jobs in such a system, such as backup jobs, are reported on at the job level, providing job-level statistics such as error reports, start time, and completion times. However, more complex storage management jobs that involve more than one data stream do not fit neatly into this paradigm. Typically, a data stream originates at a source storage device from which a data agent reads the source data to be backed up and processes it; the processed data stream is then transmitted to a media agent for further processing and is stored to a destination storage device in the form of a secondary copy created by the media agent.

As noted, more complex storage management jobs that involve more than one data stream do not fit neatly into job-level reporting or component-specific performance logging. For example, performance logs from multiple components or from simultaneous tasks on any given component must be reconciled in order to obtain a proper measure of performance for a particular data stream, but reconciling may require the cooperation of additional components as well as network transport. Another challenge in the prior art is that tasks involved in a backup job typically lack "awareness" of their hierarchical position relative to other tasks, which means that performance data must be further reconciled in order to properly account for different processes and their subtending tasks and subtasks. In multi-stream jobs this problem is exacerbated by multiple counters being active for the "same" task as applied to the different data streams, and reconciling the multiplicity of task counters across components of the storage management system, e.g., data agent and media agent, may be error-prone, time-consuming, and resource-intensive. Therefore, a new approach is needed for addressing performance reporting for multi-stream jobs in a storage management system.

The present inventor devised a more streamlined approach for capturing and reporting performance for individual data streams in secondary copy operations. Accordingly, each data stream is individually tracked by data agent(s) and media agent(s) in its path so that per-data-stream performance reports may be generated when or immediately after the data stream reaches its destination. No after-processing is required after all the data streams in the backup job complete.

Illustratively, the media agent that delivers the data stream to a secondary storage device also generates and stores the data stream's performance report covering the entirety of the data flow from source to destination. No polling of other components' performance reports and no reconciliation of diverse performance reports is needed. This is achieved illustratively by enhancing each backup process that operates upon the data stream to generate performance data packets in-process and merge them into the processed data stream before the next backup process takes over. According to the illustrative embodiment, in the course of passing from one backup process to another in the data agent, the data stream incrementally accumulates performance data packets from any number of constituent backup processes in the data agent. The processed data stream thus comprises its own performance data packets when transmitted by the data agent to a media agent. At the media agent, the data stream continues to accumulate performance data packets as it passes through the media agent's own backup processes.

Moreover, the in-process tracking of the data stream also involves capturing hierarchical relationships among backup processes and in-process tasks, so that the performance report can properly depict parent and child (subtending) operations to better illustrate the role/contribution of each in the flow of the data stream from source to destination. In contrast to the prior art, the hierarchical relationships are embedded into the performance data packets and may be analyzed by parsing the data stream.

The illustrative enhanced media agent parses the data stream before dispatching a secondary copy of the source data to secondary storage. The data packets that belong to the secondary copy are transferred to secondary storage, thus completing the data stream's flow. The media agent analyzes the performance data packets in the data stream and generates a performance report for the data stream. The performance report covers the data stream from source to destination, based on the accumulated information carried by the performance data packets. The media agent illustratively stores the performance report locally as a flat file, so that it may be available at any time.

The illustrative approach thus has a number of advantages. First, the illustrative system is organized around each data stream individually, thus providing improved reporting granularity over the prior art; moreover, there is no need to reconcile multiple counters for the "same" task in a multi-stream job, since each data stream is treated individually. Second, by incrementally accumulating performance data packets into the data stream as it passes along its logical flow, no local or interim performance logs need to be kept, retrieved, or polled; instead, the performance data is embedded in and travels with the data stream. Third, by capturing hierarchical relationships among tracked in-process tasks, no post-processing and reconciliation is required; instead, the relationship information is embedded in the performance data packets in the data stream. Fourth, the performance report is generated concurrently with or immediately after the secondary copy is stored to the destination storage device, and therefore the performance report is more timely than prior art solutions; moreover, the performance report is generated locally by the media agent and does not require further system components and network resources to retrieve and transmit local/interim logs to the media agent. These and other advantages of the illustrative embodiment may be better understood after a careful reading of the rest of the present disclosure.

BRIEF DESCRIPTION OF THE DRAWINGS

FIGS. 1F-1H are block diagrams illustrating suitable data structures that may be employed by the information management system.

FIG. 9 depicts an example performance report 468 generated in system 200 for an illustrative data stream 2 in backup job 6.

FIG. 10 depicts an example performance report 468 (partial) generated in system 200 for an illustrative data stream 34 in backup job 53.

FIG. 11 depicts an example performance report 468 (partial) generated in system 200 for an illustrative data stream 34 in backup job 53.

DETAILED DESCRIPTION

Detailed descriptions and examples of systems and methods according to the present invention may be found in the section entitled INCREMENTALLY ACCUMULATING IN-PROCESS PERFORMANCE DATA AND HIERARCHICAL REPORTING THEREOF FOR A DATA STREAM IN A SECONDARY COPY OPERATION, as well as in the section entitled Example Embodiments, and also in FIGS. 2-11 herein. Furthermore, components and functionality for incrementally accumulating in-process performance data and reporting thereof for a data stream in secondary copy operations may be configured and/or incorporated into information management systems such as those described herein in FIGS. 1A-1H.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 1A:
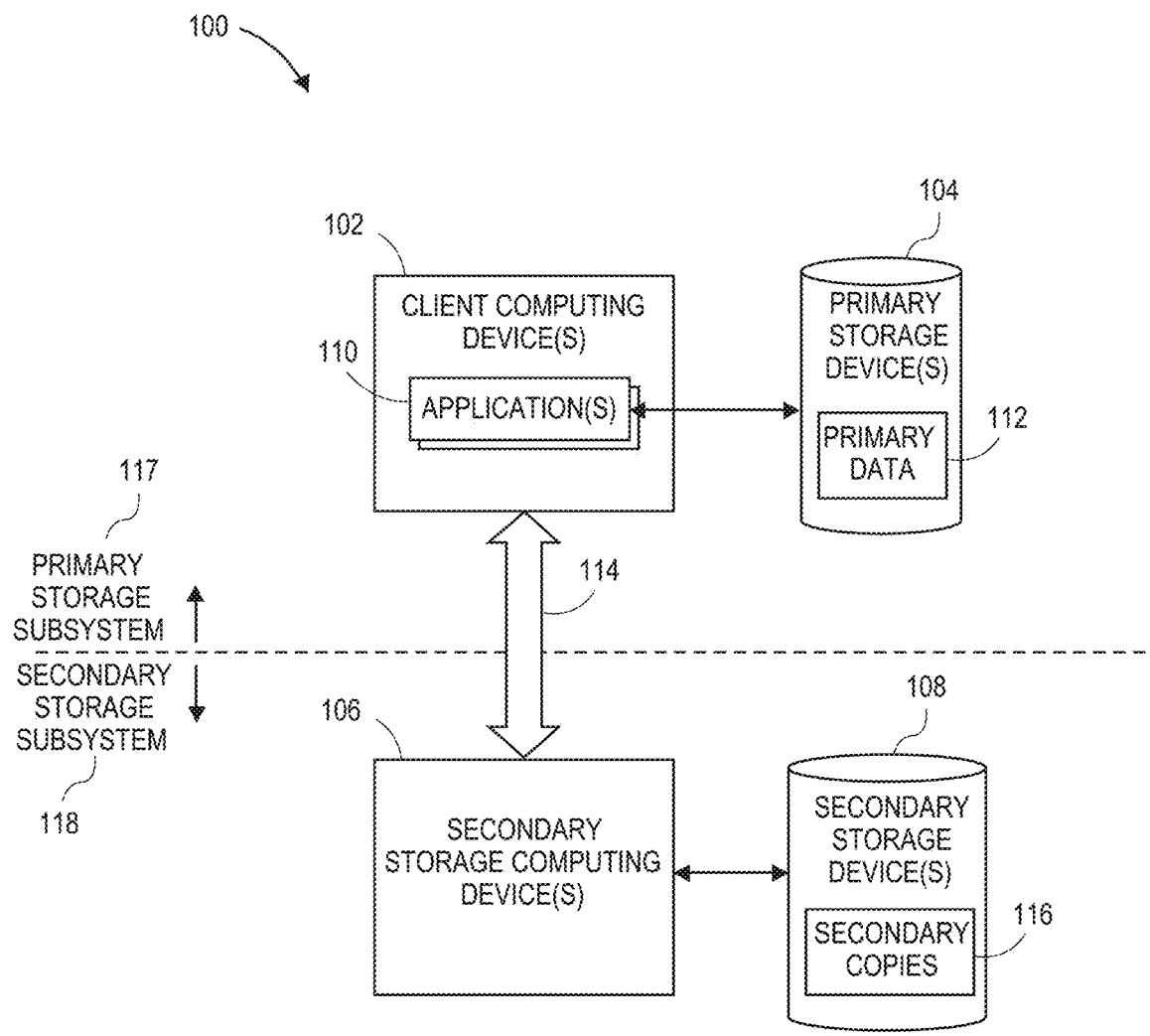
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,229,954, entitled "Managing Copies Of Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. Pub. No. 2006/0224846, entitled "System and Method to Support Single Instance Storage Operations";

U.S. Pat. Pub. No. 2009/0319534, entitled "Application-Aware and Remote Single Instance Data Management";

U.S. Pat. Pub. No. 2012/0150818, entitled "Client-Side Repository in a Networked Deduplicated Storage System"; and U.S. Pat. Pub. No. 2012/0150826, entitled "Distributed Deduplicated Storage System".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. In this regard, the client computing devices 102 may in some configurations be viewed as a type of "client" within the context of the information management system 100. However, the use of the word "client" in the term "client computing device" does not imply that the client computing devices 102 are necessarily "clients" in the client/server sense, or in any other sense, or that the client computing devices 102 cannot be "servers" in other respects. For instance, a particular client computing device 102 may act as a server with respect to other devices, such as with respect to other client computing devices 102. As is described in further detail herein, the client computing devices 102 can be configured to provide data to other components in the information management system 100 upon request, such as to the secondary storage computing devices 106. In this context, the client computing devices 102 may be viewed as a type of a data server. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, the secondary storage computing devices 106 index the secondary copies 116 so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of a particular secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices For Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and devices that write to, read from, or otherwise interact with the secondary storage devices 108, such as the secondary storage computing devices 106 and corresponding media agents, can in some cases require specialized programmed intelligence and/or hardware capability.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability and improve system performance. For instance, incorporation of specialized secondary storage computing devices 106 and corresponding media agents for interfacing with the secondary storage devices 108 and/or for performing data processing operations can greatly improve the speed with which the information management system 100 performs secondary storage operations (e.g., data protection operations such as data backups, indexing operations, and the like), as well as the capacity of the system to handle large numbers of such operations.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
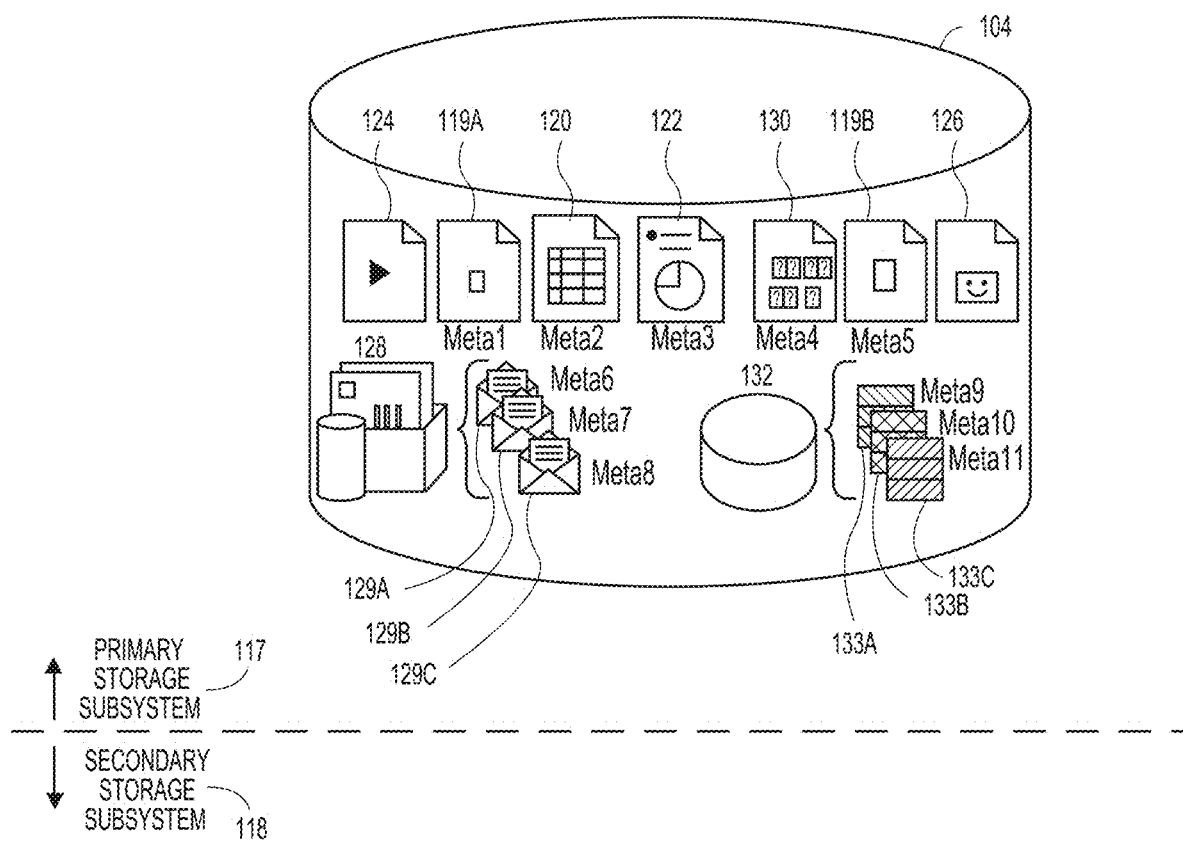
FIG. 1B is a detailed view of a primary storage device, a secondary storage device, and some examples of primary data and secondary copy data.
Figure 1B:
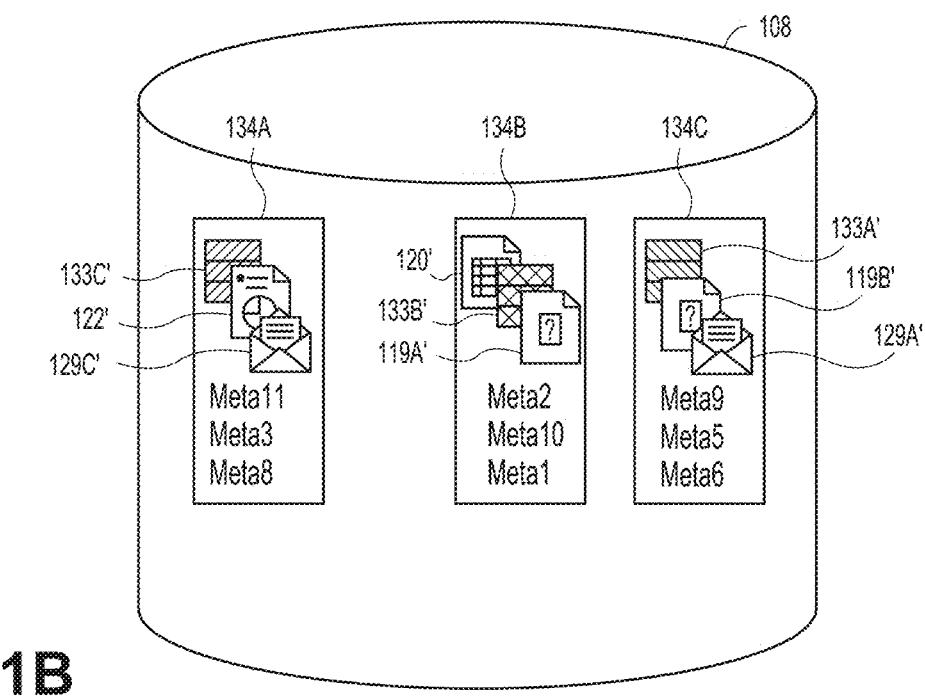

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), the secondary storage computing devices 106 or other components in the secondary storage subsystem 118 may process the data received from the primary storage subsystem 117 and store a secondary copy object including a transformed and/or supplemented representation of a primary data object and/or metadata that is different than the original format, e.g., in a compressed, encrypted, deduplicated, or other modified format. For instance, the secondary storage computing devices 106 can generate new metadata or other information based on said processing, and store the newly generated information along with the secondary copy objects. The secondary storage computing devices 106 can perform some or all of the processing during data protections, for example. Secondary data object 1346 represents primary data objects 120, 1336, and 119A as 120', 133B', and 119A', respectively and accompanied by corresponding metadata Meta2, Meta10, and Meta1, respectively. Also, secondary data object 134C represents primary data objects 133A, 1196, and 129A as 133A', 1196', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
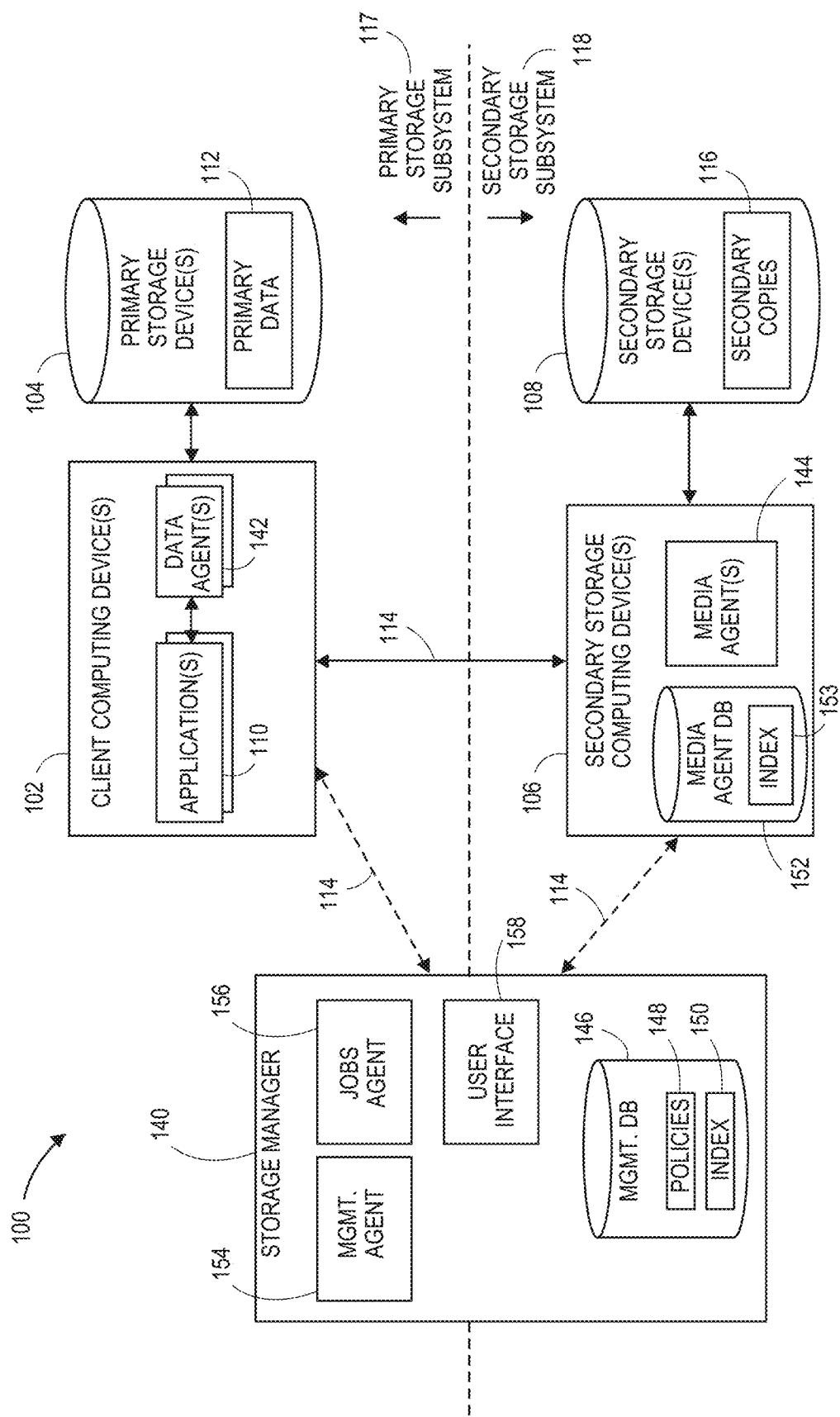
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances, without having to replace or re-design the remainder of the system. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. In this manner, the storage manager controls the operation of various hardware and software components in the information management system 100. In certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
 initiating execution of secondary copy operations;
 managing secondary storage devices 108 and inventory/capacity of the same;
 reporting, searching, and/or classification of data in the information management system 100;
 allocating secondary storage devices 108 for secondary storage operations;
 monitoring completion of and providing status reporting related to secondary storage operations;
 tracking age information relating to secondary copies 116, secondary storage devices 108, and comparing the age information against retention guidelines;
 tracking movement of data within the information management system 100;
 tracking logical associations between components in the information management system 100;
 protecting metadata associated with the information management system 100; and
 implementing operations management functionality.

The storage manager 140 may maintain a database 146 (or "storage manager database 146" or "management database 146") of management-related data and information management policies 148. The database 146 can be stored in computer memory accessible by the storage manager 140. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a stored data structure or other information source that specifies a set of parameters (e.g., criteria and rules) associated with storage or other information management operations.

The storage manager 140 can process an information management policy 148 and/or the index 150 and, based on the results of the processing, identify a data protection operation or other information management operation to perform, identify the appropriate components in the information management system 100 that are involved in the operation (e.g., client computing devices 102 and corresponding data agents 142, secondary storage computing devices 106 and corresponding media agents 144, etc.), establish connections to those components and/or between those components, and control those components to carry out the operation. In this manner, the information management system 100 can translate stored information into coordinated activity between the various computing devices in the information management system 100.

The storage manager database 146 may maintain the information management policies 148 and associated data, although the information management policies 148 can be stored in computer memory at any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

User Interfaces

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

The present disclosure describes various embodiments of interactive and dynamic user interfaces, some of which may be generated by the user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like.

Various embodiments of the information management system 100 may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Information Management Cell

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to back up the Exchange mailboxes, a Microsoft Exchange Database data agent 142 to back up the Exchange databases, a Microsoft Exchange Public Folder data agent 142 to back up the Exchange Public Folders, and a Microsoft Windows File System data agent 142 to back up the file system of the client computing device 102. In such embodiments, these specialized data agents 142 may be treated as four separate data agents 142 even though they operate on the same client computing device 102. Application-specific data agents 142 can have improved performance as compared to generic agents. For instance, because application-specific data agents 142 may only handle data for a single software application, the design of the data agent 142 can be streamlined. The data agent 142 may therefore execute faster and consume less persistent storage and/or operating memory than agents designed to generically accommodate multiple different kinds of software applications.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the secondary storage computing device(s) 106 and corresponding media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 significantly improve the speed and efficiency with which the information management system 100 can perform restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
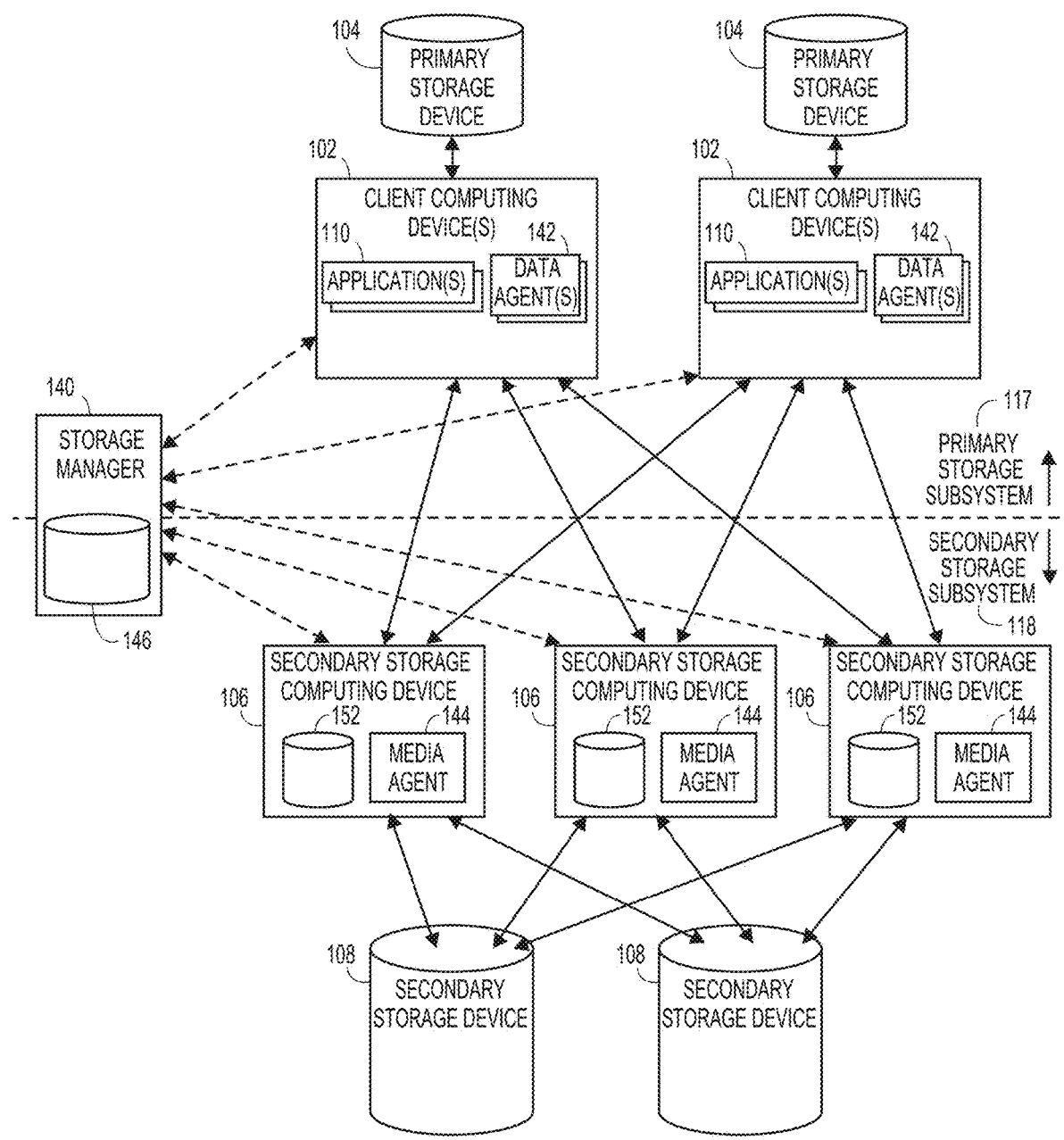
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria, greatly increasing the search speed capability of the information management system 100.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations. For instance, the metabase can dramatically improve the speed with which the information management system can search through and identify data as compared to other approaches which can involve scanning an entire file system. Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
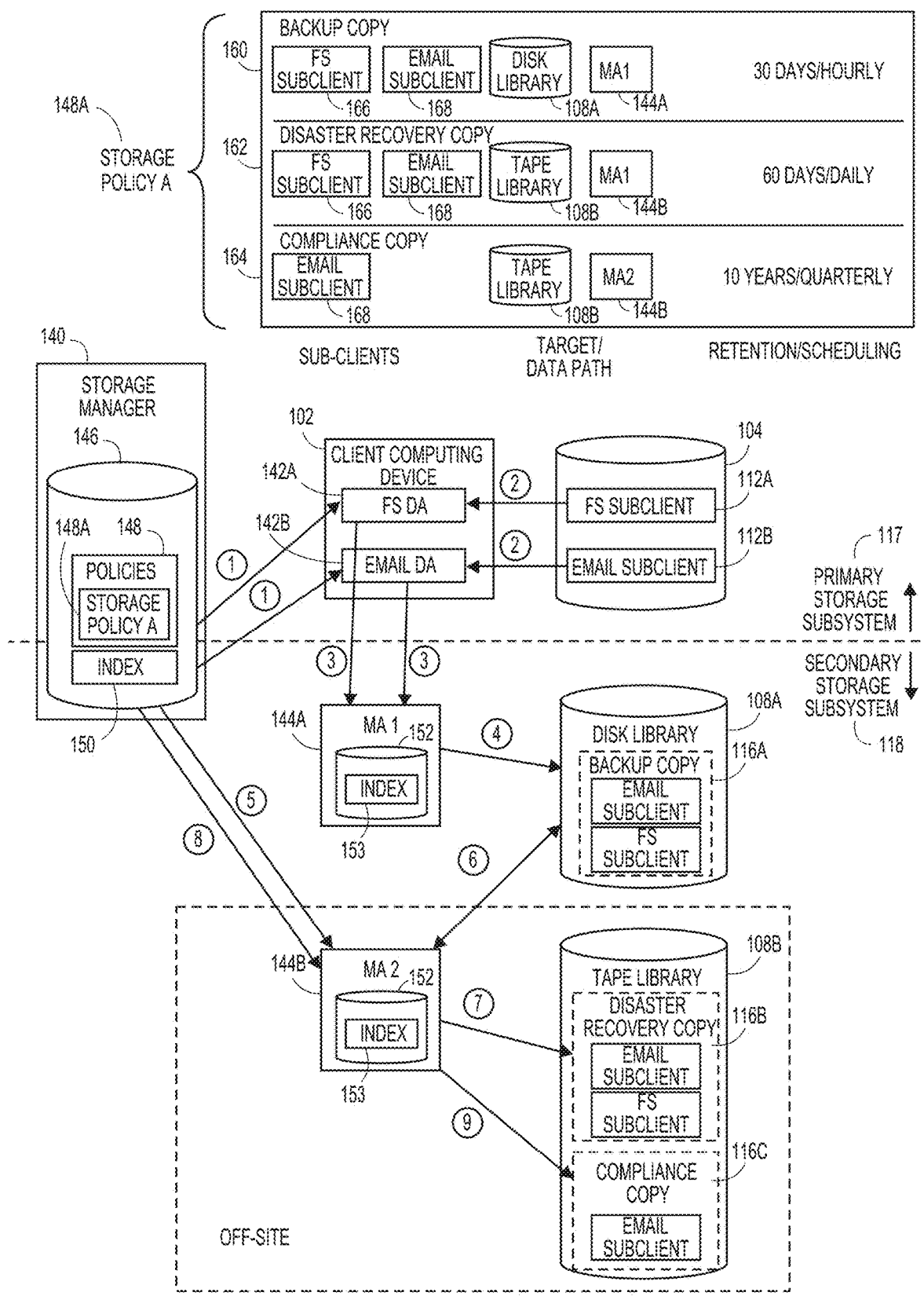
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112B, which is associated with a logical grouping of data associated with email. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments.

Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 1166 according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
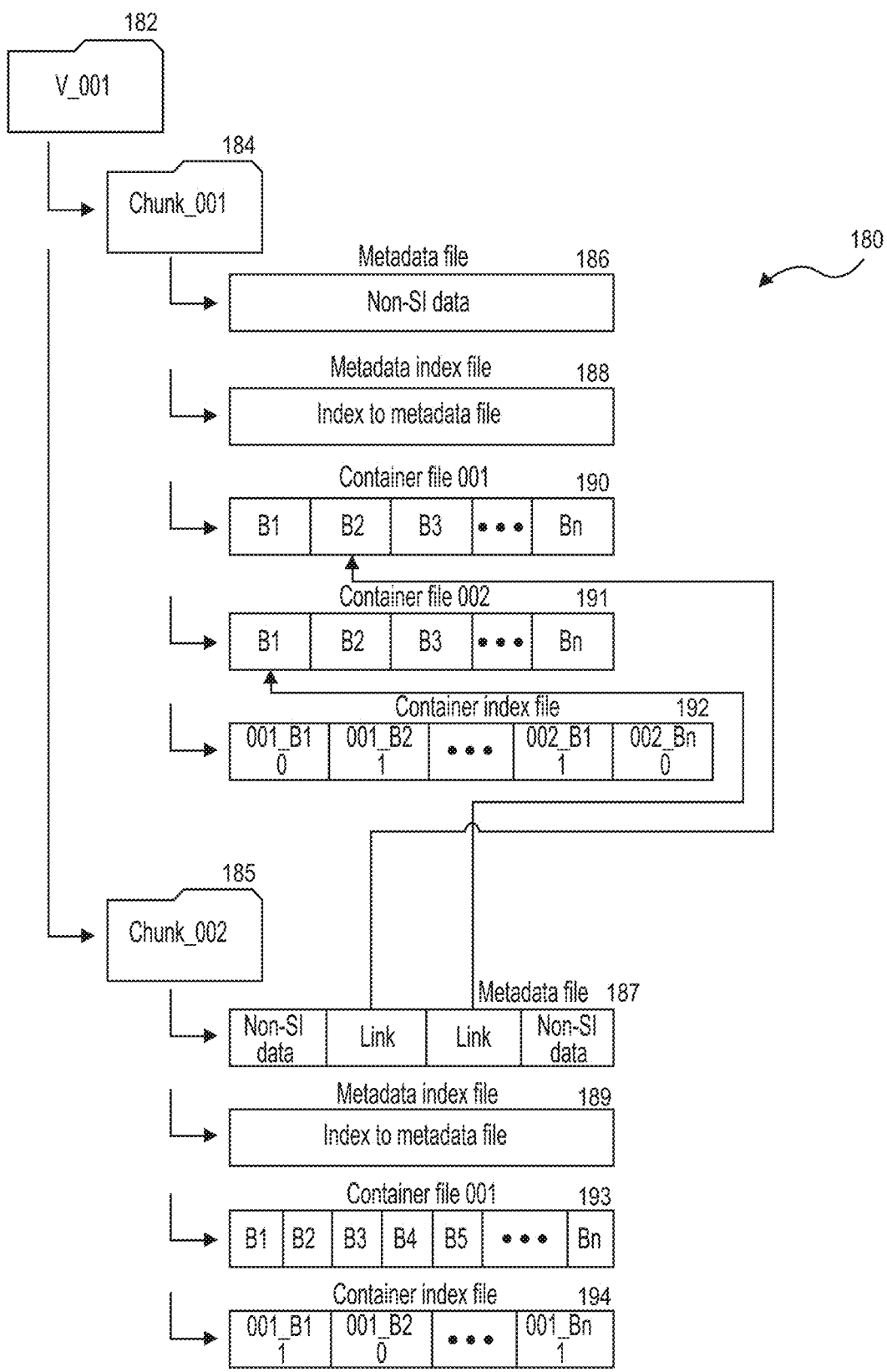

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

INCREMENTALLY ACCUMULATING IN-PROCESS PERFORMANCE DATA AND HIERARCHICAL REPORTING THEREOF FOR A DATA STREAM IN A SECONDARY COPY OPERATION

Figure 2:
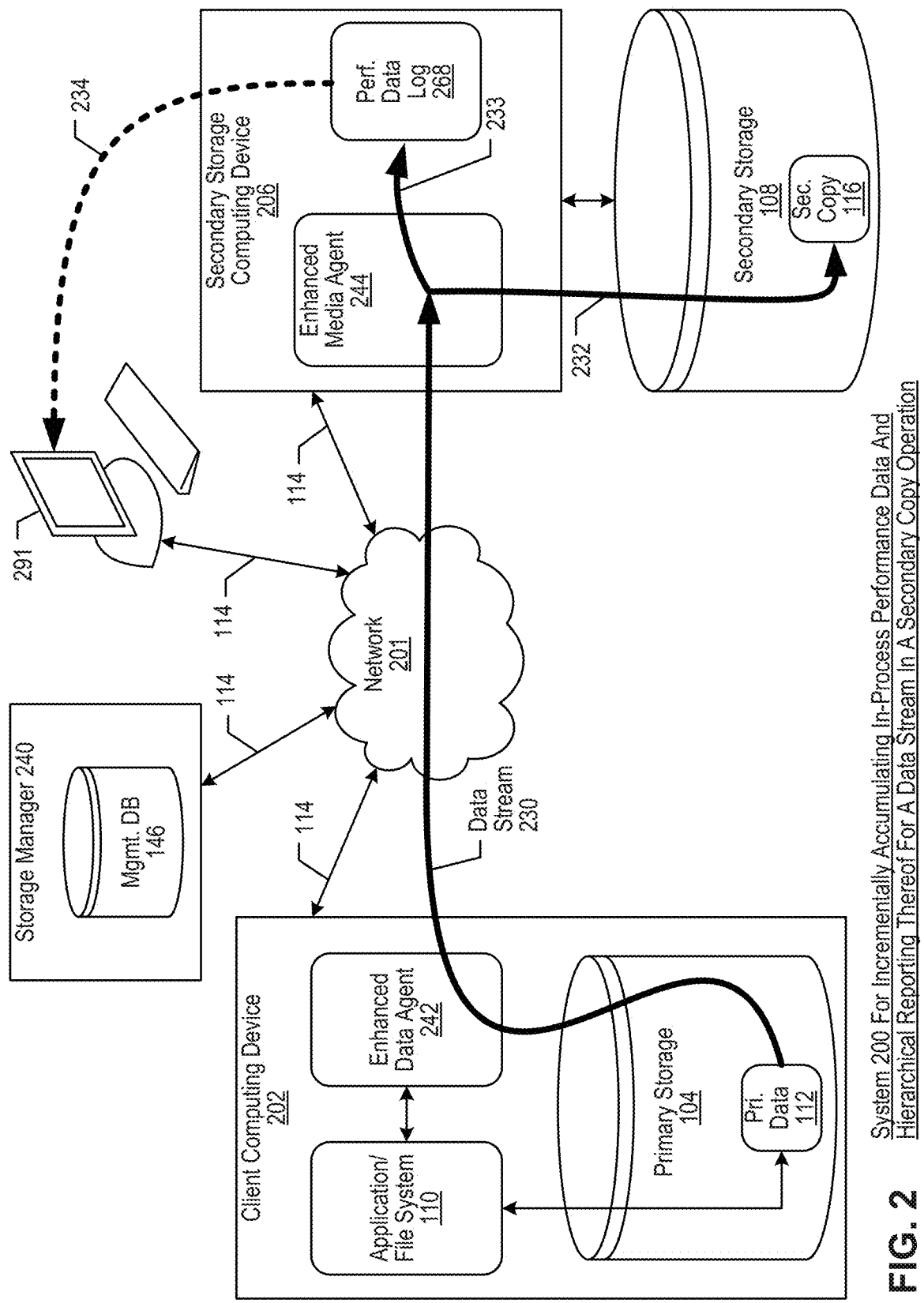
FIG. 2 is a block diagram illustrating some salient portions of a storage management system 200 for incrementally accumulating in-process performance data and hierarchical reporting thereof for a data stream in a secondary copy operation, according to an illustrative embodiment of the present invention.

FIG. 2 is a block diagram illustrating some salient portions of a storage management system 200 for incrementally accumulating in-process performance data and hierarchical reporting thereof for a data stream in a secondary copy operation, according to an illustrative embodiment of the present invention. Storage management system 200 may be an embodiment of an information management system, and illustratively comprises: secondary storage device 108 which stores secondary copy 116; client computing device 202, comprising primary storage device 104 (which stores primary data 112), application/file system 110, and enhanced data agent 242; secondary storage computing device 206, comprising enhanced media agent 244 and performance data log 268; and storage manager 240, comprising management database 146. Network 201 and console 291 need not be part of system 200; likewise, in some alternative embodiments, primary storage 104 and secondary storage 108 may operate outside system 200, e.g., as cloud storage infrastructure. The depicted components may be interconnected as shown by the solid bi-directional arrows. The communications infrastructure to support these and any other necessary interconnections is well known in the art and may comprise any suitable electronic communications solution, such as described in regard to communication pathways 114. Data streams 230, 232, and 233, and logical data pathway 234 are also shown illustratively and are described in more detail below. Components 104, 108, 110, 112, 116, and 146 are described in more detail above.

Network 201 may be any electronics communication infrastructure known in the art and sufficient to carry data from data agent 242 to media agent 244. Examples are given above in regard to communication pathways 114.

Client computing device 202 is analogous to client computing device 102 described in more detail above, and further comprises additional functionality for operating in system 200, e.g., hosting and executing enhanced data agent 242. Client computing device 202 comprises one or more processors (e.g., a CPU comprising one or more processor units and/or single-core or multi-core processor(s), etc.) and non-transitory computer-readable memory (e.g., random access memory (RAM)) for storing executable computer-readable instructions such as computer programs and/or applications that may be executed therefrom by the one or more processors. A client computing device 202 may comprise additional computer-readable memory for mass data storage, e.g., a hard disk such as storage device 104, and/or may be associated with and/or have networked access to an external mass storage device such as a storage array (not shown) or cloud-based storage (not shown). Illustratively, client computing device 202 hosts an application and/or file system 110 to which enhanced data agent 242 is coupled for protecting application/file system 110 and the data it accesses, generates, and manages in primary storage, e.g., primary data 112. System 200 may comprise any number of client computing devices 202.

Secondary storage computing device 206 is analogous to secondary storage computing device 106 described in more detail above, and further comprises additional functionality for operating in system 200, e.g., hosting and executing enhanced media agent 244. Secondary storage computing device 206 comprises one or more processors (e.g., a CPU comprising one or more processor units and/or single-core or multi-core processor(s), etc.) and non-transitory computer-readable memory (e.g., random access memory (RAM)) for storing executable computer-readable instructions such as computer programs and/or applications that may be executed therefrom by the one or more processors. Secondary storage computing device 206 may comprise additional computer-readable memory for mass data storage, e.g., cache memory, a hard disk, etc. and may be further associated with an external mass storage device such as secondary storage device 108. Illustratively, secondary storage computing device 206 hosts media agent 244, which is communicatively coupled with secondary storage device 108 to which it may store secondary copies of data being backed up and from which it may restore backed up data; secondary storage computing device 206 may locally store (e.g., in cache and/or hard disk) performance data log 268 according to the illustrative embodiment. System 200 may comprise any number of secondary storage computing devices 206 and respective associated secondary storage devices 108.

Data streams 230, 232, and 233, and logical data pathway 234 are also shown illustratively operating according to an illustrative embodiment. Data stream 230 originates at primary data 112, is processed by enhanced data agent 242 and enhanced media agent 244 and adds corresponding performance data packets as it is processed, and is then parsed and bifurcated by enhanced media agent 244 into data stream 232 and data stream 233. Data stream 232 comprises the data packets that form secondary copy 116, which is a secondary copy of the source primary data 112. Data stream 233 represents the accumulated performance data packets 301 that have been generated by the various backup processes operating on data stream 230 as it is processed by enhanced data agent 242 and enhanced media agent 244; these performance data packets 301 are parsed by enhanced media agent 244, which generates a performance report 468 for data stream 230 (e.g., using data parser and report generator 445), and the performance report 468 is stored to performance data log 268. Logical data pathway 234, from performance data log 268 to console 291, illustrates that a user may access one or more performance reports 468 in performance data log 268. Any number of data streams 230 may be employed to perform a given backup job in system 200, and therefore, any number of corresponding data streams 232 and 233 may result, as well as corresponding performance reports 468 for the respective data stream 230.

Storage manager 240 is analogous to storage manager 140 described in more detail above, and may further comprise additional functionality for operating in system 200, e.g., logic for communicating to/from enhanced data agent 242 and enhanced media agent 244, logic for tracking the location and/or contents of performance data log 268, data stream performance reports 468, and any suitable associations with one or more data streams and backup jobs. The tracked information may be stored in a management database, such as management database 146.

Enhanced data agent 242 (or "data agent 242") is analogous to data agent 142, and further comprises additional functionality for operating in system 200, e.g., performing in-process performance analysis and generating performance data packets, and integrating the performance data packets into the data stream being processed by data agent 242, incrementally accumulating the performance data packets as the data stream proceeds from one backup process to the next, etc., without limitation.

Enhanced media agent 244 (or "media agent 244") is analogous to media agent 144, and further comprises additional functionality for operating in system 200, e.g., performing in-process performance analysis and generating performance data packets, and integrating the performance data packets into the data stream being processed by media agent 244, incrementally accumulating the performance data packets as the data stream proceeds from one backup process to the next; parsing the resultant data stream 230 and bifurcating it into data stream 232 for secondary copy 116 and data stream 233 for performance reporting; generating a data stream performance report 468 based on the performance data packets accumulated in data stream 230, and storing the performance report to performance data log 268, etc., without limitation.

Performance data log 268 (or "log 268") is a data structure that comprises any number of data stream performance reports 468 generated by media agent 244. Illustratively, log 268 is stored on secondary storage computing device 206, which also hosts media agent 244, e.g., in cache memory, on a local hard disk, etc. In some alternative embodiments, log 268 may be stored in external storage, e.g., secondary storage device 108, and/or management database 146, etc. Performance data log 268 may also comprise index information (not shown) about the performance reports 468.

Console 291 is a component well known in the art, which, according to the illustrative embodiment, displays to a human user an interface for viewing one or more data stream performance reports 468.

As noted elsewhere herein, system 200 may comprise any number of the above-enumerated components, and may operate any number of backup jobs, each backup job having one or more concurrent data streams.

Figure 3:
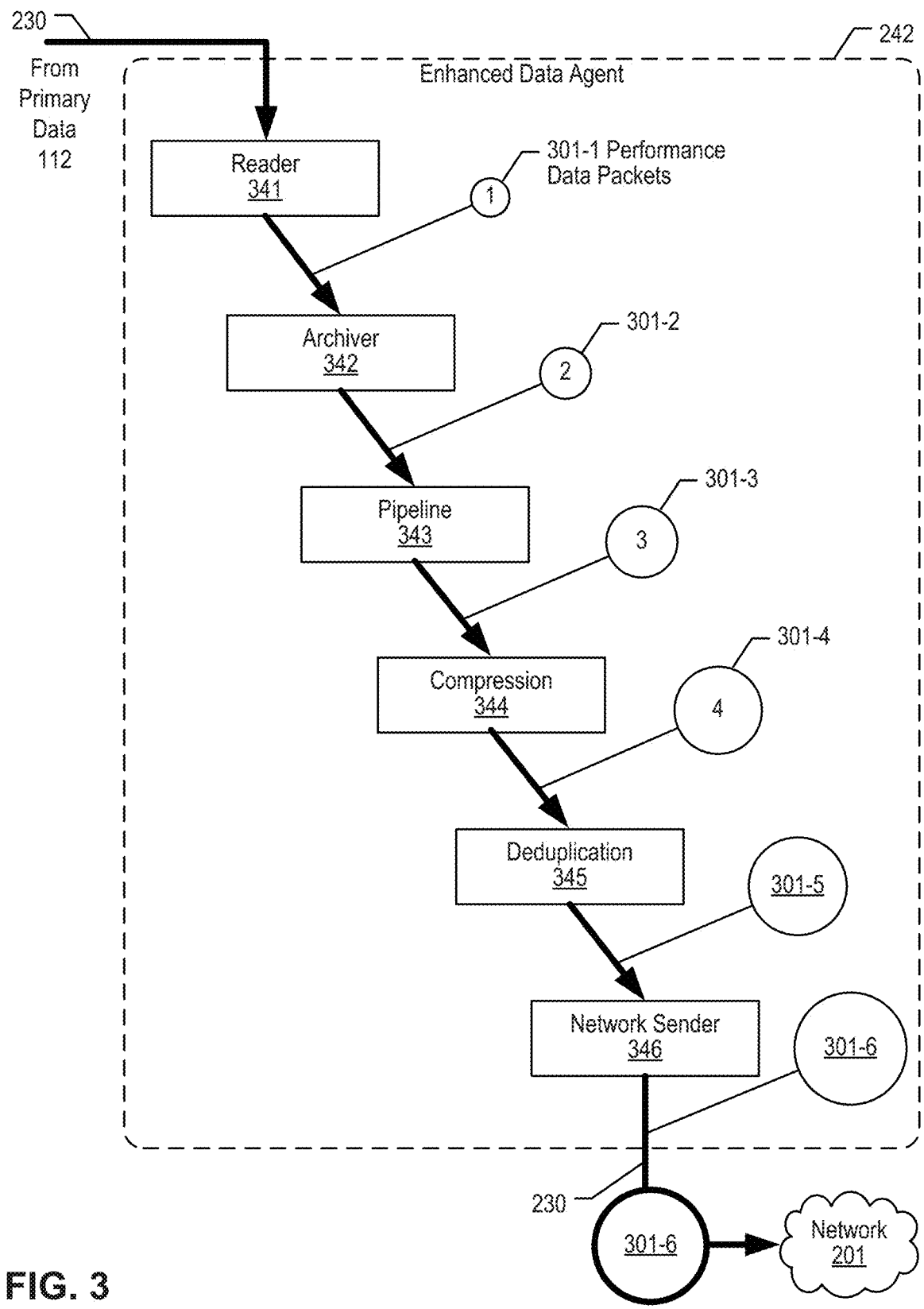
FIG. 3 is a block diagram depicting some details of system 200, including incremental accumulation of performance data for data stream 230 being processed by enhanced data agent 242.

FIG. 3 is a block diagram depicting some details of system 200, including incremental accumulation of performance data for data stream 230 being processed by enhanced data agent 242. FIG. 3 illustratively depicts: network 201; data stream 230, comprising accumulated performance data packets; and enhanced data agent 242, comprising a plurality of backup processes 341-346 and respective associated performance data packets 301 (e.g., 301-1 through 301-6). Data stream 230 is depicted by the successive bold unidirectional arrows.

Performance data packets 301-1 through 301-6 represent cumulative performance data packets which are generated by successive backup process in data agent 242 and which are successively merged into data stream 230 being processed by the data agent. As data stream 230 progresses from one backup process to the next, e.g., from 341 to 342, each backup process adds its own performance data packets 301 and as a result the total number of performance data packets 301 in the data stream accumulates incrementally. The cumulative effect is pictorially illustrated in the present figure and in FIG. 4 by increasingly larger circles representing the accumulated performance data packets 301. For example, there are more performance data packets after archiver 342 has processed data stream 230 than there were after reader 341 processed data stream 230. The circles representing the accumulated performance data packets 301 in data stream 230 are merely illustrative and not to scale. More performance data packets 301 are generated in media agent 244 (see, e.g., FIG. 4).

Illustratively, the cumulative set of performance data packets which have been merged and accumulated into data stream 230 in the course of data agent 242 processing data stream 230 are labeled performance data packets 301-6. Performance data packets 301-6 thus comprise all the predecessor data packets 301, illustratively introduced in 301-1 through 301-5, plus additional performance data packets generated in the final backup process of the data agent, e.g., network sender 346. Performance data packets 301-6 are shown in the bold circle at the bottom of FIG. 3 as being part of data stream 230 when it exits data agent 242 and is illustratively transmitted to media agent 244 via network 201. Thus, data stream 230, as it exits data agent 242, comprises the performance data packets 301 generated by the backup processes 341-346, and further comprises the "secondary copy" data packets which result from the processing of data stream 230 by the backup processes 341-346. Backup processes 341-346 are shown here for illustrative and are not exclusive; therefore, data agent 242 may comprise more or fewer backup processes than those shown in the present figure.

Reader 341, archiver 342, pipeline 343, compression 344, deduplication 345, and network sender 346, are backup processes that execute as part of data agent 242 when data agent 242 processes a data stream for backup, e.g., as part of a backup job. Although these backup processes are depicted as a sequence here, in some cases a backup process may be used by a predecessor backup process in the course of processing data stream 230 (e.g., may be a subtending backup process of a parent backup process). Therefore, the sequence shown here may be a logical progression of backup processes, rather than stand-alone or independent operations. Although the principal functionality of each backup process may be well known in the art, such as data compression, each respective backup process is enhanced according to the illustrative embodiment to additionally self-track, e.g., in-process monitoring of one or more of its constituent (or subtending) tasks, and also to generate performance metrics, which are illustratively captured as performance data packets 301 that each respective backup process merges into data stream 230. Accordingly, each backup process receives data stream 230, processes data stream 230, generates performance data packets 301, merges them into an output data stream, and as a result outputs/ transmits a processed version of data stream 230 that includes the merged performance data packets 301, such that the processed version of data stream 230 is suitable for processing by the next backup process. More details may be found in subsequent figures, e.g., FIG. 6.

Moreover, in a given backup job, more than one data stream 230 may be used in backing up a certain data source, e.g., 112; according to the illustrative embodiment, each data stream 230 is individually processed by the data agent 242 and its constituent backup processes, e.g., reader 341, etc., and likewise processed by media agent 244 so that the in-process performance metrics that are generated thereby are in reference to the particular data stream 230, not to the backup job as a whole. This level of granularity at the data stream level advantageously enables the illustrative embodiment to generate performance data that more specifically identify performance results than simply reporting on the backup job as a whole.

Reader 341 is a backup process that illustratively reads data physically from the source to be backed up, e.g., primary data 112 stored in primary storage device 104 in a manner that is well known in the art. Illustratively, reader 341 is application-specific relative to the application/file system 110, e.g., Microsoft Windows® file system, which generates and maintains the source data 112. Thus, reading the source data 112 may be an application-specific process. A reader 341 may be configured to be directed to any type of application/file system 110, e.g., Oracle database management system, SQL database management system, Exchange mail, etc., without limitation. As noted earlier, reader 341 also includes self-tracking and performance metric generation according to the illustrative embodiment.

Archiver 342 is a backup process that illustratively comprises an application library (well known in the art) used for creating new backup instances, which are to be sent to a target media agent such as media agent 244. As noted earlier, archiver 342 also includes self-tracking and performance metric generation according to the illustrative embodiment.

Pipeline 343 is a backup process, which may be used by archiver 342, to connect the present data agent 242 to a specific media agent such as media agent 244 and transfer data thereto. Pipeline 343 may comprise and/or use the following backup processes for processing data stream 230 and moving data to media agent 244: compression 344, source-side deduplication 345, encryption (not shown), integrity creator (not shown), and network sender 346. As noted earlier, pipeline 343 also includes self-tracking and performance metric generation. Hierarchical relationships, if any, become part of the performance reporting according to the illustrative embodiment.

Compression 344 is a backup process that illustratively encodes information such that fewer bits are needed to represent the information as compared to the original representation. Compression techniques are well known in the art. Compression 344 may apply one or more data compression algorithms to the incoming data stream 230. As noted earlier, compression 344 also includes self-tracking and performance metric generation according to the illustrative embodiment. Compression 344 may be optionally applied to any given data stream.

Deduplication 345 (or source-side deduplication) is a backup process that illustratively eliminates redundant data from being stored again to secondary storage, according to techniques that are well known in the art. As noted earlier, deduplication 345 also includes self-tracking and performance metric generation according to the illustrative embodiment. Deduplication 345 may be optionally applied to any given data stream.

Encryption (not shown) is a backup process that illustratively encrypts data in data stream 230 for security purposes according to techniques that are well known in the art. As noted earlier, encryption also includes self-tracking and performance metric generation according to the illustrative embodiment. Encryption of data stream 230 at the data agent may be optionally applied to any given data stream.

Integrity creator (not shown) is a backup process that may format and prepare data stream 230 for transmission to media agent 244, e.g., calculating and inserting checksums into data stream 230 for later use in error detection and correction at the media agent 244. As noted earlier, integrity creator also includes self-tracking and performance metric generation according to the illustrative embodiment.

Network sender 346 is a backup process that illustratively makes a network connection (e.g., establishes and maintains an electronic communications pathway such as via network 201) with media agent 244, and transfers data stream 230 thereto. As noted earlier, network sender 346 also includes self-tracking and performance metric generation according to the illustrative embodiment. After network sender 346, data stream 230 comprising accumulated performance data packets 301-6 is transmitted to media agent 244, e.g., via network 201.

Figure 4:
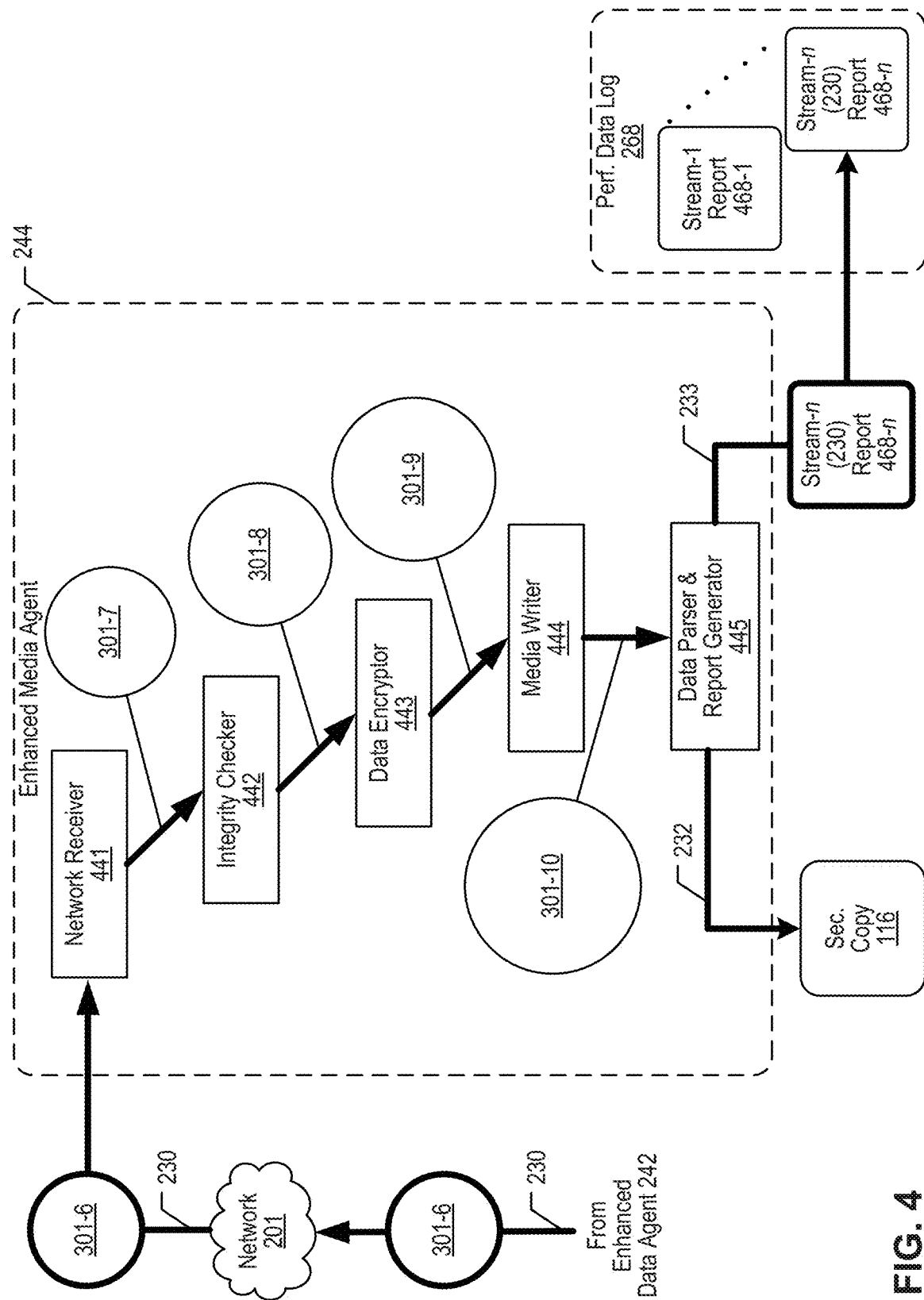
FIG. 4 is a block diagram depicting some details of system 200, including incremental accumulation of performance data for data stream 230 being processed by enhanced media agent 244 and reporting of performance data to performance data log 268.

FIG. 4 is a block diagram depicting some details of system 200, including incremental accumulation of performance data for data stream 230 being processed by enhanced media agent 244 and further depicting reporting of data stream performance data to performance data log 268. FIG. 4 depicts: data stream 230, comprising accumulated performance data packets 301-6 and traversing network 201 to reach media agent 244; enhanced media agent 244, comprising a plurality of backup processes 441-444 and respective associated performance data packets 301 (e.g., 301-7 through 301-10), and data parser & report generator 445; data stream 232 flowing to secondary copy 116; data stream 233 flowing to performance data log 268, and comprising performance report 468-n for data stream 230; and performance data log 268, comprising any number of performance reports 468 (e.g., 468-1, . . . , 468-n).

Performance data packets 301-7 through 301-10 represent cumulative performance data packets generated by successive backup processes in media agent 244 and successively merged into data stream 230 being processed by the media agent. As data stream 230 progresses from one backup process to the next, e.g., from 441 to 442, each backup process adds its own performance data packets and the total number of performance data packets 301 in the data stream accumulates incrementally. The cumulative effect is pictorially illustrated in the present figure and in FIG. 3 by increasingly larger circles representing the accumulated performance data packets 301. For example, there are more performance data packets after network receiver 441 has processed data stream 230 than upon arrival at media agent 244. The circles representing the accumulated performance data packets 301 in data stream 230 are merely illustrative and not to scale.

Illustratively, the cumulative set of performance data packets which have been merged and been accumulated into data stream 230 in the course of media agent 244 processing data stream 230 are labeled performance data packets 301-10. Performance data packets 301-10 thus comprise all the predecessor data packets 301, illustratively introduced in 301-1 through 301-9, plus additional performance data packets generated in the last backup process of the media agent, e.g., media writer 444.

Network receiver 441, integrity checker 442, data encryptor 443, and media writer 444 are backup processes that execute as part of media agent 244 when media agent 244 processes a data stream for backup, e.g., as part of a backup job. Although these backup processes are depicted as a sequence here, in some cases a backup process may be used by a predecessor backup process in the course of processing data stream 230 (e.g., may be a subtending backup process of a parent backup process). Therefore, the sequence shown here may be a logical progression of backup processes, rather than stand-alone or independent operations. As mentioned earlier in regard to data agent 242, likewise here: although the principal functionality of each backup process may be well known in the art, such as data encryption, each respective backup process is enhanced according to the illustrative embodiment to additionally self-track, e.g., in-process monitoring of one or more of its constituent tasks, and also to generate performance metrics, which are illustratively captured as performance data packets 301 that each respective backup process merges into the data stream 230. Accordingly, each backup process receives data stream 230, processes data stream 230, generates performance data packets 301, merges them into an output data stream, and as a result outputs a processed version of data stream 230 that includes the merged performance data packets 301, such that the processed version of data stream 230 is suitable for further processing downstream. More details may be found in subsequent figures, e.g., FIG. 6.

Network receiver 441 is a backup process that illustratively maintains a network connection (e.g., electronic communications such as via network 201) with data agent 242 and receives data stream 230 therefrom, e.g., from network sender 346 according to communications techniques that are well known in the art. As noted earlier, network receiver 441 also includes self-tracking and performance metric generation according to the illustrative embodiment. In some embodiments, a parent pipeline process (not shown) in media agent 244 may comprise network receiver 441.

Integrity checker 442 is a backup process that may perform error detection and correction of data stream 230, based at least in part on information provided by the integrity creator process in data agent 242. As a result of this backup process, media agent 244 assures that data received from data agent 242 is "healthy" and may properly undergo further processing by media agent 244. As noted earlier, integrity checker 442 also includes self-tracking and performance metric generation according to the illustrative embodiment. In some embodiments, a parent pipeline process (not shown) in media agent 244 may comprise integrity checker 442.

Data encryptor 443 is a backup process that illustratively encrypts data in data stream 230 for security purposes according to techniques that are well known in the art. As noted earlier, data encryptor 443 also includes self-tracking and performance metric generation according to the illustrative embodiment. Encryption of data stream 230 at the media agent may be optional, for example if data stream 230 has already been encrypted by data agent 242. In some embodiments, a parent pipeline process (not shown) in media agent 244 may comprise data encryptor 443.

Media writer 444 is a backup process that illustratively writes or directs the writing of data physically to the destination or target data storage device, e.g., tape, disk, cloud, etc., according to techniques that are well known in the art. As depicted in FIG. 4, data stream 230 passes through data parser and report generator 445 before any data is written to secondary storage, e.g., secondary copy 116 stored to secondary storage device 108. Media writer 444 may be media-specific and configured to operate with particular target media associated with media agent 244, e.g., secondary storage device 108 in FIG. 2. As noted earlier, media writer 444 also includes self-tracking and performance metric generation according to the illustrative embodiment. In alternative embodiments, media writer 444 may comprise the functionality of data parser and report generator 445.

In regard to the backup processes enumerated in FIGS. 3 and 4, alternative embodiments may be differently implemented such that, for example: one or more of the enumerated backup processes are not used; the enumerated backup processes are executed in a different sequence; one or more of the enumerated processes uses/comprises one or more of the remaining backup processes, so that a parent-child hierarchical relationship may exist therebetween; one or more of the enumerated processes may operate as sub-processes of another parent backup process, so that a child-child hierarchical relationship may exist between the sub-processes; etc., without limitation. Although these backup processes are depicted individually to aid the reader in understanding of the illustrative embodiment, these processes may be combined and/or differently implemented and/or differently organized within the respective data agent 242 and media agent 244, while still retaining the functionality of self-tracking and performance metric generation.

Data parser and report generator 445 is a functional component of media agent 244. When it executes according to the illustrative embodiment, data parser and report generator 445 is largely responsible for: parsing data stream 230 and bifurcating it into (i) data for secondary copy 116 and (ii) performance data packets 301; preparing secondary copy 116 and storing it to secondary storage device 108, e.g., using data stream 232; analyzing the accumulated performance data packets 301 and generating a performance report 468 for data stream 230, which report may include hierarchical relationships between processes and/or tasks; and storing performance report 468 to performance data log 268, e.g., using data stream 233. Furthermore, data parser and report generator 445 may also interoperate with other components, e.g., reporting status and/or location of performance report 468 to storage manager 240 and/or to media agent index 153 (not shown in the present figure).

Data parser and report generator 445 is shown herein as a distinct functional component of media agent 244 to ease understanding of the present disclosure, however, alternative embodiments are also possible within the scope of the present invention. For example, data parser and report generator 445 may be layered on or combined with other media agent code, e.g., media writer 444, or may be a logical construct whose functionality is distributed through one or more other functional modules of media agent 244, and in any combination thereof. In some alternative embodiments, data parser and report generator 445 may be implemented separately from media agent 244 and may, for example, execute after media agent 244 has completed processing data stream 230.

Performance report 468 illustratively results from the analysis and processing of performance data packets 301 (e.g., 301-10) by data parser and report generator 445. According to the illustrative embodiment, performance report 468 is generated in reference to a particular data stream 230, and therefore a backup job comprising more than one data stream will generate a corresponding number of per-data-stream performance reports. Examples of performance report 468 are shown in FIGS. 9, 10, and 11 herein. The media agent illustratively stores the performance report 468 as a flat file, so that it may be available at any time, e.g., accessed by console 291, transmitted to management database 146, etc.

Figure 5:
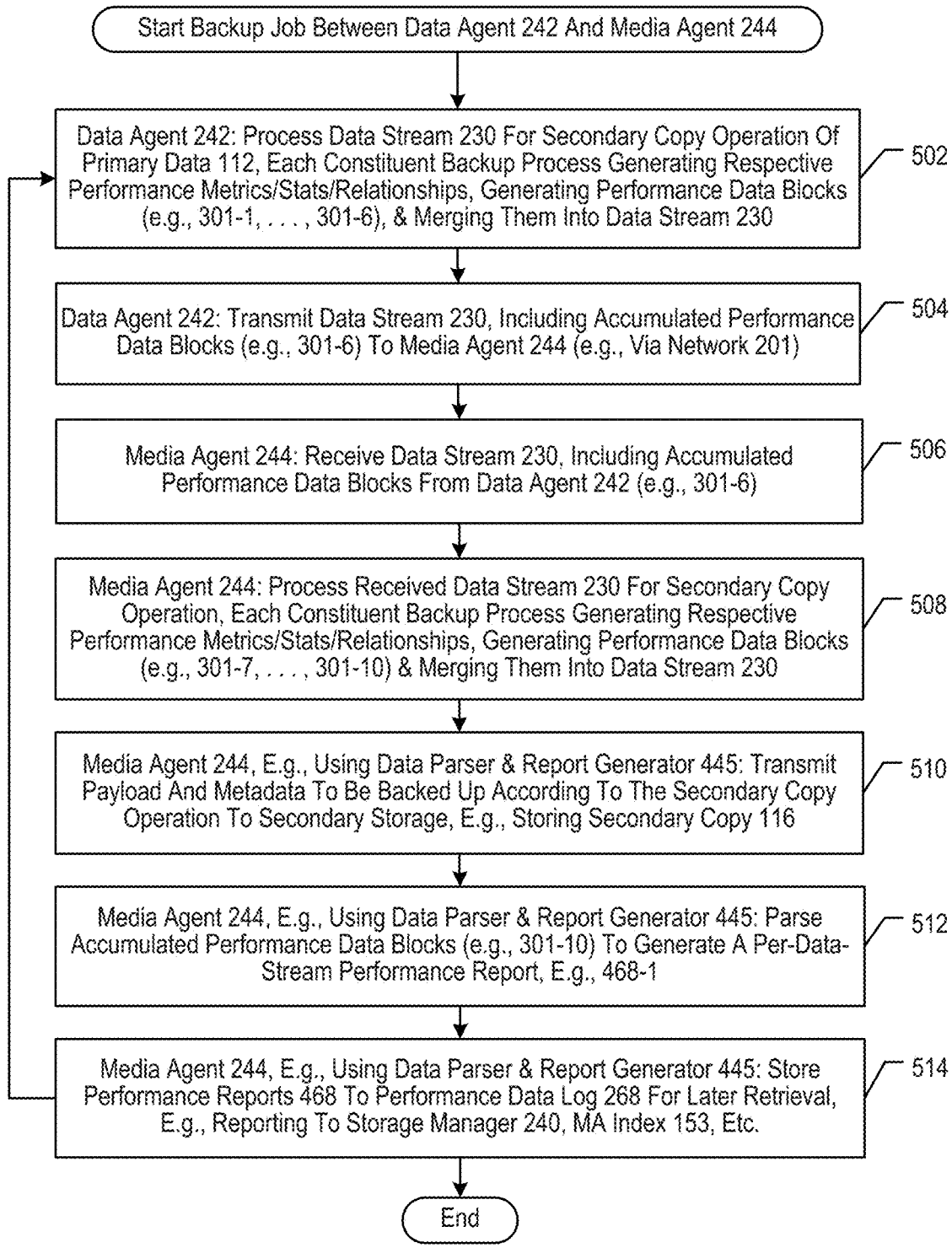
FIG. 5 depicts some salient operations of a method 500 according to an illustrative embodiment of the present invention.

FIG. 5 depicts some salient operations of a method 500 incrementally accumulating in-process performance data and hierarchical reporting thereof for a data stream in a secondary copy operation, according to an illustrative embodiment of the present invention. The illustrative operations of method 500 may be executed by the recited components of storage management system 200. Illustratively, a backup job begins between data agent 242 and media agent 244, involving any number of data streams 230. A number of communications between the recited components and storage manager 240 may also occur during the course of performing method 500, but any such communications and related operations that are known in the prior art are not shown in the present figure.

At block 502, data agent 242 may process data stream 230 (one of a set of data streams in the backup job) for a secondary copy operation required in the backup job in respect to primary data 112 (e.g., making an archive copy of primary data 112), each constituent backup process generating respective performance metrics, statistics, and/or hierarchical relationships, generating performance data blocks (e.g., 301-1, . . . , 301-6), and merging the performance data blocks 301 into data stream 230. The illustrative constituent backup processes of data agent 242 were described in more detail in FIG. 3. Of course, each constituent backup process also processes stream 230 for the secondary copy operation, e.g., reading data 112 based on application-specific logic, performing compression, inserting integrity markers, etc. The performance data blocks 301 are based on the performance of this multitude of backup processes, sub-processes, and tasks. The illustrative result of block 502 is data stream 230, comprising processed data packets directed to secondary copy 116 (e.g., compressed data) as well as performance data packets 301-6, as shown at the bottom of FIG. 3. More detail on block 502 is given in a subsequent figure.

At block 504, data agent 242 may transmit data stream 230, including accumulated performance data blocks (e.g., 301-6) to media agent 244 (e.g., via network 201). Transmission from a data agent to a media agent is an operation that is well known in the art. In the present illustrative embodiment, the transmission includes performance data packets 301 which are part of data stream 230, having been merged thereinto by data agent 242.

At block 506, media agent 244 may receive data stream 230, including accumulated performance data blocks 301-6 from data agent 242. As noted in regard to block 504, transmission from a data agent to a media agent is an operation that is well known in the art.

At block 508, media agent 244 may process data stream 230 received from data agent 242 for a secondary copy operation (e.g., making an archive copy), each constituent backup process of the media agent generating respective performance metrics, statistics, and/or hierarchical relationship indicators, generating respective performance data blocks 301, and merging them into data stream 230. The illustrative constituent backup processes of media agent 244 were described in more detail in FIG. 4. More detail on block 508 is given in a subsequent figure.

At block 510, media agent 244, e.g., using data parser and report generator 445 (or using media writer 444 in some alternative embodiments), may transmit the data blocks belonging to secondary copy 116 to secondary storage device 108. In other words, media agent 244 may generate a proper secondary copy 116 of primary data 112 (e.g., an archive copy). Secondary copy 116 is also indexed according to techniques well known in the art.

At block 512, media agent 244, e.g., using data parser & report generator 445, may parse accumulated performance data blocks (e.g., 301-10) from data stream 230 to generate a performance report for data stream 230, e.g., 468-1. Media agent 244 may analyze performance data blocks 301, including information about hierarchical relationships among processes and subtending in-process tasks, and may generate a performance report that not only reports performance metrics and statistics, but also depicts hierarchical relationships to better illuminate what happened. Example performance reports are described in more detail in FIGS. 9, 10, and 11 herein. Media agent 244, in addition to generating each performance report 468, may also generate associated indexing information, e.g., indexing the job ID, the stream ID, the primary data source storage device, and any number of performance metrics.

At block 514, media agent 244, e.g., using data parser & report generator 445, may store each performance report 468 to performance data log 268 for later retrieval; this may include reporting to storage manager 240, media agent index 153, etc. Media agent may further store the indexing information about performance report 468 to an appropriate storage location, e.g., performance data log 268, management database 146, media agent index 153, etc., without limitation. As noted earlier, in some alternative embodiments data parser and report generator 445 may operate outside media agent 244, e.g., after media agent 244 has stored secondary copy 116 to secondary storage 108, and thus, in such alternative embodiments, blocks 512 and 514 may execute outside media agent 244.

Figure 6:
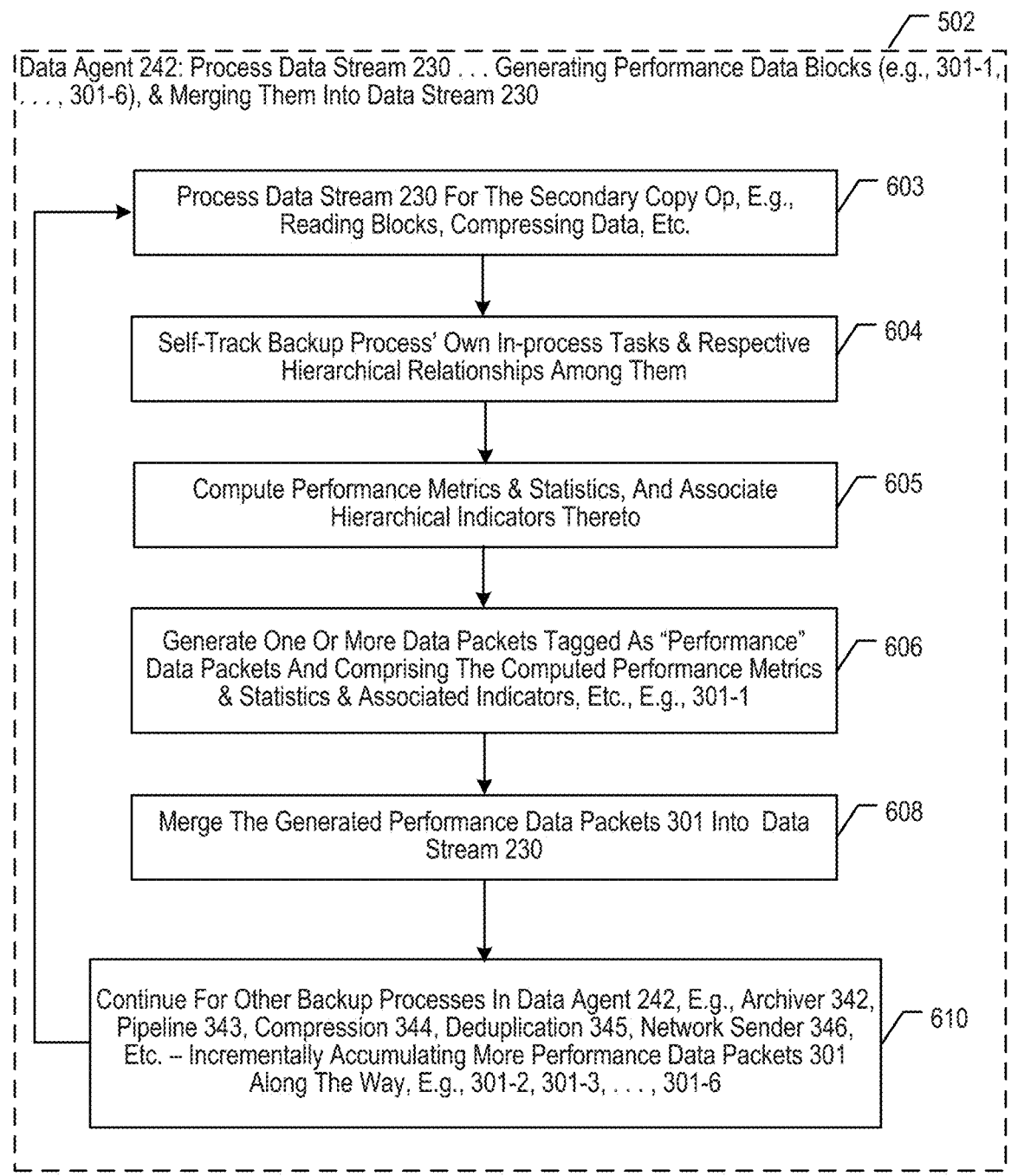
FIG. 6 depicts some salient sub-operations of block 502 in method 500.

FIG. 6 depicts some salient sub-operations of block 502 in method 500. In general, block 502 is directed to processing of primary data 112 by data agent 242 in a certain data stream 230, each constituent backup process generating respective performance metrics, statistics, and/or hierarchical relationship indicators, generating performance data blocks (e.g., 301-1, . . . , 301-6), and merging the performance data blocks 301 into data stream 230. Logically, block 502 executes for all constituent backup processes of data agent 242 operating upon data stream 230.

At block 603, data agent 242 (e.g., the current backup process) may process data stream 230 for the present secondary copy operation (e.g., creating an archive copy). The processing may include media access protocols for accessing the source data, application-specific data access and formatting, establishing integrity markers for the read data and/or for transmission, compression, deduplication, encryption, and/or preparation for transmitting data stream 230 to media agent 244. See FIG. 3 for more details on the functionality of the constituent backup processes of data agent 242. The illustrative result of block 508 is data stream 230 comprising processed data packets directed to secondary copy 116 as well as comprising the cumulative set of performance data packets 301-6, as shown in FIG. 3.

At block 604, data agent 242 (e.g., the current backup process) may self-track in-process tasks being executed in the preceding block—tasks that may be measured for performance and may be mapped to hierarchical relationships. The tasks that are to be tracked are pre-defined as part of the enhancements of the illustrative embodiment, and may include tracking byte counts and elapsed time. Task hierarchies also may be tracked so that parent-child relationships may be defined. Examples of in-process tracking may include, without limitation: (i) tracking how many bytes of data have been read from primary storage device 104, and how much time elapsed in doing so; (ii) tracking how many bytes of data ran through compression 344 and how much time elapsed in executing the compression logic; (iii) tracking tasks in the course of executing deduplication backup process 345, including identifying any number of levels of hierarchical relationships, such as recognizing which task is a parent and which tasks may be subtending children, or further subtending children of child tasks, etc.; (iv) tracking the number of deduplication signatures which were processed; (v) etc. Any number and types of in-process tasks may be tracked here, as well as any number of levels of task hierarchy, without limitation. More examples of in-process tasks may be found in the sample reports in FIGS. 9, 10, and 11.

At block 605, data agent 242 (e.g., the current backup process) may compute performance metrics and statistics based on the in-process tracking in the preceding block, and may also associate the resultant metrics and statistics with indicator(s) of the hierarchical relationships. Examples may include, without limitation: (i) computing a data rate for data read from primary storage 104 and associating this metric with reader 341; (ii) computing a compression data rate and compression 344 backup process; (iii) counting the number of signatures found in a deduplication database (not shown) in the course of deduplicating data stream 230 and associating this task as a child task of source-side deduplication 345 backup process; (iv) etc. Any number of performance metrics and statistics and associated relationship indicators may be generated by any given backup process, and different backup processes may generate different numbers and types of performance metrics and statistics, as well as varying degrees of hierarchical depth. More detail on block 605 is provided in a subsequent figure.

At block 606, data agent 242 (e.g., the current backup process) may generate one or more data packets 301, which it tags as "performance" data packets. Performance data packets represent the performance metrics, statistics, and associated hierarchical relationship indicators generated in the preceding blocks. Any number of performance data blocks 301 may be generated by any given backup process, and the number of performance data blocks 301 may vary from one backup process to another.

At block 608, data agent 242 (e.g., the current backup process) may merge the generated performance data packets 301 from block 606 above into the data stream 230 that results from block 603. Therefore data stream 230 may comprise any number of accumulated performance data packets 301 generated from the current and previous backup processes that operated upon data stream 230, such as reader 341, archiver 342, etc.

Because the performance data blocks are tagged as such in the present operation, they may be distinguished from other data blocks in data stream 230 such as payload data and metadata which are directed to generating secondary copy 116. As a result, some subsequent backup processes may not operate upon these specially-identified performance data blocks 301, e.g., will not attempt to deduplicate or compress. Therefore, while each backup process (e.g., 341, 342) may add performance data blocks 301 to data stream 230, performance data blocks 301 may pass unprocessed through subsequent some backup processes and accumulate in data stream 230 with each subsequent backup process. In some circumstances, it may be appropriate to process performance data blocks 301, e.g., in establishing integrity markers or encrypting data stream 230 for transport across network 201. Whether they are processed or passed through by any given backup process in data agent 242 or media agent 244, performance data packets 301 remain part of data stream 230 and gradually make their way through the logical flow of data stream 230 as it progresses from source to destination, ultimately reaching a point in media agent 244 (e.g., data parser and report generator 445) where they are parsed and processed.

At block 610, control passes back to block 603 to continue executing other backup processes in data agent 242, e.g., archiver 342, pipeline 343, compression 344, deduplication 345, network sender 346, etc.—incrementally accumulating more performance data packets 301 along the way. When data agent 242 has executed all its constituent backup processes, block 502 may end.

Figure 7:
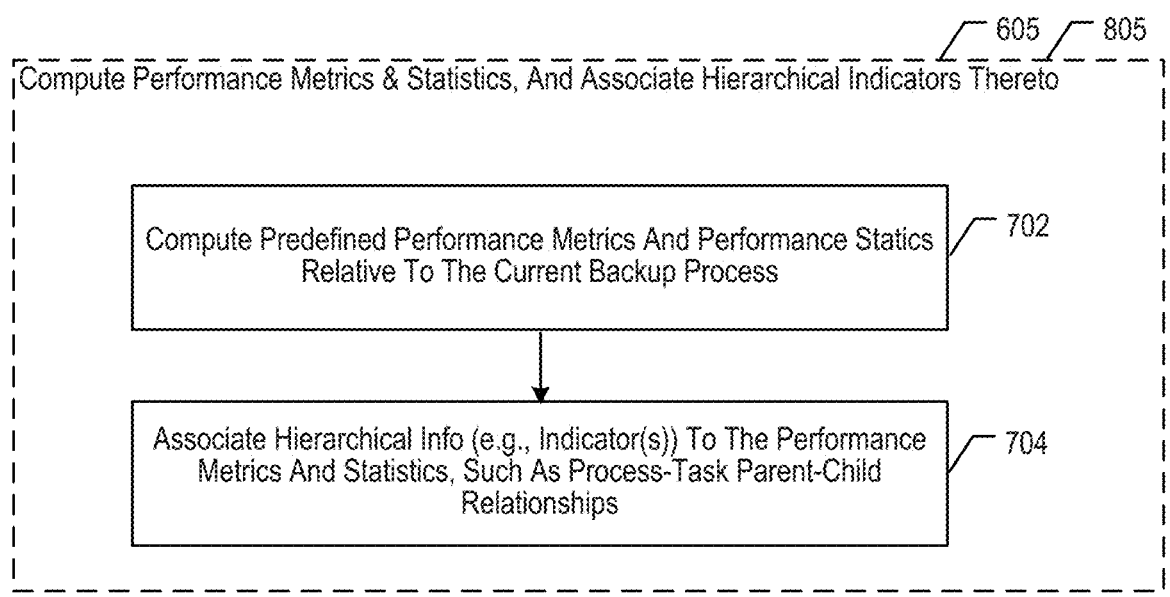
FIG. 7 depicts some salient sub-operations of block 605 in block 502 and block 805 in block 508 of method 500.

FIG. 7 depicts some salient sub-operations of block 605 in block 502 and block 805 in block 508 of method 500. At block 605, data agent 242 (e.g., the current backup process) may compute performance metrics and statistics based on the in-process tracking at block 604, and further, may associate the resultant metrics and statistics with indicator(s) of hierarchical relationships. Likewise, at block 805, media agent 244 (e.g., the current backup process) may compute performance metrics and statistics and may further associate hierarchical indicators. These metrics and statistics pertain to the processing of the current data stream, e.g., 230, thus producing a level of reporting granularity at the data stream level according to the illustrative embodiment.

At block 702, data agent 242 and/or media agent 244 (e.g., the current backup process) may compute predefined performance metrics and statistics relative to the current backup process and its in-process tasks. No distinction need be made here as to whether a reported performance item is a metric or a statistic. The terms "performance metric" and "performance statistics" may be used interchangeably herein.

Examples of data agent-related performance metrics and statistics include without limitation some of the examples below, and may also be found in FIGS. 9, 10, and 11:

Time elapsed for buffer allocation task in reader 341 backup process;

Time elapsed, byte count, and GB-per-hour data rate for read task in reader 341 backup process;

Time elapsed, byte count, and GB-per-hour data rate for pipeline write task in reader 341 backup process;

Time elapsed, byte count, and GB-per-hour data rate for source-side compression 344 backup process;

Time elapsed, byte count, and GB-per-hour data rate for signature task in source-side deduplication 345 backup process;

Time elapsed, byte count, and GB-per-hour data rate for computing signatures under the signature task of source-side deduplication 345;

Time elapsed for source-side deduplication processing task under the signature task of source-side deduplication 345;

Time elapsed for buffer allocation task under the signature task of source-side deduplication 345;

Time elapsed for deduplication signature lookup task under the signature task of source-side deduplication 345;

Counts for a number of tasks under signature lookup task under the signature task of source-side deduplication 345, e.g., number of signatures processed, number of new signatures, number of signatures found in deduplication database, application data size byte count, processed data size byte count, new data size byte count, dropped data size byte count and percentage, non-deduplicatable data size byte count;

Byte count, elapsed time, and data rate for CRC update task under pipeline 343 backup process;

Byte count, elapsed time, and data rate for network transfer task under network sender 346 backup process.

Any number of other performance metrics and statistics may be defined and implemented in regard to one or more backup processes executing in media agent 244.

Examples of media agent-related performance metrics and statistics include without limitation some of the examples below, and may also be found in FIGS. 9, 10, and 11:

Byte count, elapsed time, and data rate for network receive task under network receiver 441 backup process;

Time elapsed for index update task, e.g., under a media agent parent pipeline backup process;

Time elapsed, byte counts, and data rate for media writer 444 backup process illustratively under a parent pipeline backup process at the media agent;

Time elapsed, byte count, and data rate for commit and record update task under media writer 444 backup process;

Time elapsed, byte count, and data rate for disk write task under media writer 444 backup process.

Any number of other performance metrics and statistics may be defined and implemented in regard to one or more backup processes executing win data agent 242.

At block 704, data agent 242 and/or media agent 244 (e.g., the current backup process) may associate hierarchical information to the performance metrics and statistics in reference to process-task parent-child relationships, peer relationships, etc. For example, a given performance metric of a first task may be associated with a hierarchical indicator that indicates the task is a parent of a second task; conversely the second task's performance metric(s) will be associated with an indicator that the second task is a child of the parent first task. These indicators are captured in the performance data packets 301 generated at block 606/806, and therefore the associations persist through the processing of data stream 230. Later on, in generating a performance report 468, these indicators will be parsed and used to structure the appearance to the performance report to incorporate the hierarchical relationships (see, e.g., FIGS. 9, 10, 11).

For example, element 911 in FIG. 9 depicts how hierarchical relationships relative to data agent pipeline-related backup processes might be shown in a sample performance report 468. Illustratively, "Compression," "Signature Module" (deduplication), and "Network Transfer" are mutual siblings that are shown as children of "Reader Pipeline Modules" (data agent pipeline). In turn, "Signature Module" has subtending children of its own, such as "Signature Compute" and "Src-side Dedup," (source-side deduplication) which in turn has further subtending children. These depictions are enabled by the intelligent capture of process-task hierarchical relationships at blocks 604 and 804 and the further association of hierarchical indicators in the present block, followed by the retention of these indicators/associations in the performance data blocks 301 generated at block 606/806.

Figure 8:
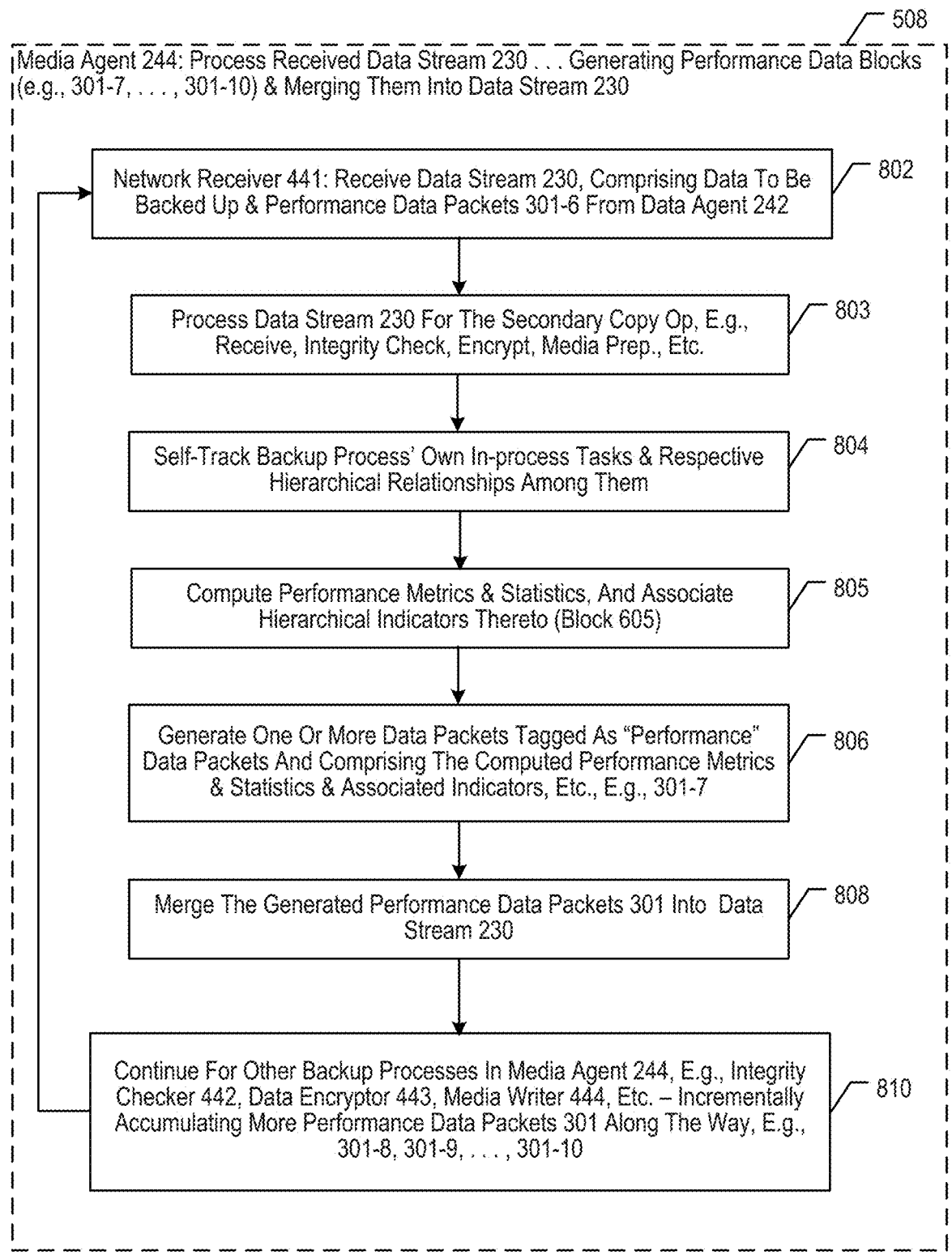
FIG. 8 depicts some salient sub-operations of block 508 in method 500.

FIG. 8 depicts some salient sub-operations of block 508 in method 500. In general, block 508, which is illustratively executed by media agent 244, closely resembles block 502, which is illustratively executed by data agent 242. Block 508 is directed to processing of data stream 230 as received by media agent 244 from data agent 242, each constituent backup process generating respective performance metrics, statistics, and/or hierarchical relationship indicators, generating performance data blocks (e.g., 301-7, . . . , 301-10), and merging the performance data blocks 301 into data stream 230. Logically, block 508 executes for all constituent backup processes of media agent 244 operating upon data stream 230.

At block 802, media agent 244 (e.g., using network receiver 441) may receive data stream 230 from data agent 242. At this point, data stream 230 may comprise data to be backed up as prepared by data agent 242 as well as, incorporated into data stream 230, the performance data packets 301-6, which were generated by data agent 242.

At block 803, which is analogous to block 603, media agent 244 (e.g., using the current backup process) may process data stream 230 for the present secondary copy operation (e.g., creating an archive copy). The processing may include receiving protocols, data integrity checking, encryption, and/or preparation for writing to media such as secondary storage device 108. See FIG. 4 for more details on the functionality of the constituent backup processes of media agent 244.

At block 804, which is analogous to block 604, media agent 244 (e.g., using the current backup process) may perform self-tracking of in-process tasks and respective hierarchical relationships among them.

At block 805, which is analogous to block 605, media agent 244 (e.g., using the current backup process) may compute performance metrics and statistics and may associate hierarchical indicators thereto, as described in further detail in FIG. 7.

At block 806, which is analogous to block 606, media agent 244 (e.g., using the current backup process) may generate one or more data packets 301, which it tags as "performance" data packets. As with the data agent-generated performance data packets 301, the performance data packets generated by media agent 244 represent the performance metrics, statistics, and associated hierarchical relationship indicators generated in the preceding blocks. Any number of performance data blocks 301 may be generated by any given backup process, and the number of performance data blocks 301 may vary from one backup process to another.

At block 808, which is analogous to block 606, media agent 244 (e.g., using the current backup process) may merge the generated performance data packets 301 from block 806 above into the data stream 230 that results from block 803. Therefore data stream 230 may comprise any number of performance data packets 301 generated from the current and previous backup processes, such as integrity checker 442, etc.

At block 810, control passes back to block 802 to continue executing other backup processes in media agent 244, e.g., integrity checker 442, data encryptor 443, media writer 444, etc.—thus incrementally accumulating more performance data packets 301 along the way. When media agent 244 has completed executing all its constituent backup processes, block 508 may end.

FIG. 9 depicts an example performance report 468 generated in system 200 for an illustrative data stream 2 in backup job 6.

Element 901 identifies a backup job in system 200, e.g., job 6.

Element 902 identifies the reported-on data stream 230 in the present backup job, labeled "Pipe-ID 2" illustratively.

Element 903 identifies the data source for the reported-on data stream, e.g., primary storage device 104, where primary data 112 is stored.

Element 904 labels a column for performance metrics and statistics, illustratively labeled "Perf-Counters."

Element 905 labels a column for elapsed time measured in seconds, illustratively labeled "Time (seconds)."

Element 906 labels a column for byte counts relative to the various processes and tasks, illustratively labeled "Size."

Element 907 depicts a report section header for reader 341 backup process in data agent 242, illustratively a Windows File System Data Agent. A number of subtending (or child) tasks appear beneath, including Buffer Allocation, Read, Pipeline Write, FSDM Load Library, and Media Open— each child task reporting one or more respective metrics/statistics.

Element 911 illustrates a way of depicting hierarchical relationships in regard to backup processes and tasks associated with "Reader Pipeline Modules," which illustratively refers to data agent pipeline 343, compression 344, and deduplication 345. Element 911 was described in more detail in regard to FIG. 7.

Element 912 depicts a report entry for network receive 441 backup process in media agent 244.

Element 913 depicts a report entry for media writer 444 backup process in media agent 244.

FIG. 10 depicts an example performance report 468 (partial) generated in system 200 for an illustrative data stream 34 in backup job 53.

Element 1010 depicts a number of performance statistics, in this case byte counts for respective in-process tasks, for deduplication 345 in data agent 242.

FIG. 11 depicts an example performance report 468 (partial) generated in system 200 for an illustrative data stream 34 in backup job 53.

Element 1101 depicts a report entry for network sender 346 backup process in data agent 242.

Element 1102 depicts a report entry for a parent "writer pipeline" process having a number of subtending child backup processes, including element 1103, which is a report entry for media writer 444 backup process in media agent 244.

In regard to FIGS. 2-11, other embodiments are possible within the scope of the present invention, such that the above-recited backup processes, tasks, components, steps, blocks, operations, and/or electronic communications (e.g., instructions, queries, reporting, etc.) are differently arranged, sequenced, sub-divided, organized, separated, and/or combined. In some embodiments, a different component may initiate or execute a given operation. In some embodiments, additional components may be configured in system 200 to perform one or more of the recited operations. For example, a distinct functional module that may be analogous to data parser and report generator 445 may be configured to operate outside data agent 242 and/or media agent 244 and to execute on the computing devices that host data agent 242 and media agent 244 respectively; this module may collect/compute performance metrics and statistics and may ultimately generate performance reports 468. In regard to FIGS. 9, 10, and 11, the depicted performance reports 468 are merely illustrative, and any number of variations may be created by someone having ordinary skill in the art after reading the present disclosure. Moreover, the techniques disclosed herein for accumulating performance metrics in the course of processing a data stream may be more generally used in other data processing systems, as recited in some of the example embodiments below.

Example Embodiments

According to an illustrative embodiment of the present invention, an exemplary method may comprise: parsing, by a media agent component of a storage management system, a data stream comprising first data being backed up in the storage management system, and further comprising performance data packets generated by a data agent and the media agent in the course of generating a secondary copy of the first data, wherein the media agent executes on a secondary storage computing device that comprises one or more processors and computer-readable memory, wherein the data stream originates at a first data storage device that stores the first data and terminates at a second data storage device for storing the secondary copy of the first data; and wherein the parsing by the media agent comprises: (i) storing the secondary copy to the second data storage device, and (ii) generating a performance report for the data stream based on the performance data packets, wherein the performance report provides a first set of performance metrics for the data agent processing of the data stream, and further provides a second set of performance metrics for the media agent processing of the data stream.

The above-recited method wherein the performance data packets in the data stream have been accumulated incrementally into the data stream by successive backup processes executed by the data agent and the media agent in the course of generating the secondary copy of the first data. The above-recited method wherein in the performance report, each performance metric in the first set is depicted relative to a task having a hierarchical relationship with at least one other task executed by the data agent, and wherein the performance data packets comprise indicators of the hierarchical relationship. The above-recited method wherein in the performance report, each performance metric in the second set is depicted relative to a task having a hierarchical relationship with at least one other task executed by the media agent, and wherein the performance data packets comprise indicators of the hierarchical relationship which were generated by successive backup processes, each backup process having one or more subtending tasks, executed by the data agent and the media agent in the course of generating the secondary copy of the first data.

According to another example embodiment, a system, which may be a storage management system, may comprise: a first computing device in communication with a first storage device comprising first data to be backed up to a secondary copy, wherein the first computing device comprises one or more processors and computer memory for executing a data agent; a second computing device in communication with the first computing device, wherein the second computing device comprises one or more processors and computer memory for executing a media agent, and further wherein the second computing device is in communication with a second storage device for storing the secondary copy of the first data; and wherein the data agent, when executing on the first computing device, is configured to: initiate a data stream originating at the first storage device and comprising the first data, process the data stream using successive backup processes for generating the secondary copy, generate, in each of the successive backup processes, respective performance data packets that represent measures of performance of the respective backup process including subtending tasks thereof, accumulate the performance data packets generated in each of the successive backup processes into the data stream resulting from the respective backup process, and transmit the data stream, as processed by the data agent and comprising the accumulated performance data packets to the media agent; and wherein the media agent, when executing on the second computing device, is configured to: process the data stream as received from the data agent using successive backup processes for generating the secondary copy, generate, in each of the successive backup processes, respective performance data packets that represent measures of performance of the respective backup process including subtending tasks thereof, accumulate the performance data packets generated in each of the successive backup processes into the data stream resulting from the respective backup process, and generate a performance report based on the accumulated data packets in the data stream, wherein the performance report depicts the data agent's measures of performance, and further depicts the media agent's measures of performance.

The above-recited system wherein the data agent is further configured to: generate, in each of the successive backup processes, indicators of hierarchical relationships among the respective backup process and subtending tasks thereof, and incorporate the indicators into the generated performance data packets; and wherein the performance report further depicts the hierarchical relationships among the depicted measures of performance, based on the indicators in the performance data packets. The above-recited system wherein the media agent is further configured to: generate, in each of the successive backup processes, indicators of hierarchical relationships among the respective backup process and subtending tasks thereof, and incorporate the indicators into the generated performance data packets; and wherein the performance report further depicts the hierarchical relationships among the depicted measures of performance, based on the indicators in the performance data packets.

In another example embodiment, a method for accumulating performance metrics in the course of backing up a data stream in a storage management system, the method comprising: performing a first backup process upon a data stream, by a data agent that executes on a client computing device, wherein the client computing device comprises one or more processors and computer-readable memory, wherein the data stream comprises first data being backed up, and wherein the data stream originates at a first storage device that stores the first data, and wherein performing the first backup process by the data agent comprises: tracking in-process tasks of the first backup process and respective hierarchical relationships among them, computing a first set of performance metrics of the tracked in-process tasks of the first backup process processing the data stream, generating first performance data packets collectively comprising the first set of performance metrics and associated hierarchical indicators; merging, by the first backup process into the data stream: (i) the first performance data packets with (ii) data packets which result from the processing of the data stream by the first backup process; transmitting the data stream comprising the merged first performance data packets, by the first backup process, to a second backup process performed by the data agent; and further merging into the data stream, by the second backup process: second performance data packets collectively comprising a second set of performance metrics of the second backup process processing the data stream as received from the first backup process.

The above-recited method wherein the performing of the first backup process by the data agent further comprises associating each performance metric in the first set with one or more hierarchical indicators based on the hierarchical relationships of the tracked in-process tasks of the first backup process. The above-recited method may further comprise: transmitting, by the second backup process, the data stream comprising the merged first performance data packets and second performance data packets to a media agent component of the storage management system, wherein the media agent executes on a secondary storage computing device, which comprises one or more processors and computer-readable memory. The above-recited method may further comprise: generating, by the media agent, a performance report for the data stream based on parsing the first performance data packets and the second performance data packets received in the data stream from the data agent, wherein the performance report depicts at least the first set of performance metrics and the second set of performance metrics; and storing the performance report, by the media agent, to a performance data log associated with the media agent. The above-recited method wherein the performing of the first backup process by the data agent further comprises associating each performance metric in the first set with one or more hierarchical indicators based on the hierarchical relationships of the tracked in-process tasks of the first backup process; and further comprising generating, by the media agent, a performance report for the data stream based on parsing the first performance data packets and the second performance data packets received from the data agent, wherein the performance report depicts at least the first set of performance metrics and hierarchical relationships therebetween. The above-recited method may further comprise: storing the performance report, by the media agent, to a performance data log associated with the media agent. The above-recited method wherein the performance report depicts the first set of performance metrics based on parsing the hierarchical indicators associated therewith, such that the performance report depicts parent-child relationships between in-process tasks performed by the data agent.

According to another illustrative embodiment, a method for accumulating performance metrics in the course of backing up a data stream in a storage management system, the method comprising: receiving the data stream from a data agent, by a media agent component of the storage management system, wherein the media agent executes on a secondary storage computing device, which comprises one or more processors and computer-readable memory, and wherein the data stream comprises first data being backed up, and further comprises first performance data packets collectively comprising one or more measures of performance of the data agent; performing, by the media agent, a first backup process upon the data stream, wherein performing the first backup process comprises: tracking in-process tasks of the first backup process and respective hierarchical relationships among them, computing a first set of performance metrics of the tracked in-process tasks of the first backup process processing the data stream, associating each performance metric in the first set with one or more hierarchical indicators based on the hierarchical relationships of the tracked in-process tasks of the first backup process, generating second performance data packets collectively comprising the first set of performance metrics and associated hierarchical indicators, and merging, by the first backup process into the data stream: (i) the second performance data packets with (ii) data packets which result from the processing of the data stream by the first backup process in the media agent; and generating, by the media agent, a performance report for the data stream based at least in part on parsing the first performance data packets and the second performance data packets in the data stream, wherein the performance report depicts the measures of performance of the data agent, and further depicts the first set of performance metrics of the first backup process performed by the media agent.

The above-recited method may further comprise: storing the performance report, by the media agent, to a performance data log associated with the media agent. The above-recited method wherein the performance report depicts the first set of performance metrics based at least in part on parsing the hierarchical indicators associated therewith. The above-recited method wherein the performance report depicts the first set of performance metrics based at least in part on parsing the hierarchical indicators associated therewith, such that the performance report depicts parent-child relationships between in-process tasks performed by the first backup process of the media agent. The above-recited method may further comprise: storing, by the media agent, a secondary copy of the first data to a second storage device which is in communication with the secondary storage computing device. The above-recited method may further comprise: accumulating, by the media agent, in addition to the first performance data packets and the second performance data packets, additional performance data packets generated by other backup processes performed by the media agent, wherein the additional performance data packets collectively comprise other performance metrics and associated hierarchical indicators relative to the other backup processes performed by the media agent; and generating, by the media agent, the performance report for the data stream further based on parsing the additional performance data packets.

According to yet another example embodiment, a method for accumulating performance metrics in the course of backing up a data stream in a storage management system, the method comprising: performing a first backup process upon a data stream in a backup job, by a data agent that executes on a client computing device that comprises one or more processors and computer-readable memory, wherein the data stream comprises first data being backed up in the backup job, and wherein the data stream originates at a first storage device that stores the first data, and wherein performing the first backup process by the data agent comprises: computing a first set of performance metrics of in-process tasks of the first backup process processing the data stream, generating first performance data packets collectively comprising the first set of performance metrics, merging, by the first backup process: (i) the first performance data packets and (ii) other data packets which result from processing of the data stream by the first backup process into (iii) a first processed data stream, and transmitting the first processed data stream to a second backup process performed by the data agent; and performing the second backup process by the data agent, comprising: computing a second set of performance metrics of the second backup process processing the data stream, generating second performance data packets collectively comprising the second set of performance metrics, integrating, by the second backup process: (i) the second performance data packets, (ii) the first performance data packets, and (iii) other data packets which result from processing of the first processed data stream by the second backup process into (iv) a second processed data stream; wherein the second processed data stream comprises an accumulation of performance data packets generated by the data agent in the course of backing up the first data, wherein the accumulation comprises the first performance data packets and the second performance data packets.

The above-recited method may further comprise: transmitting the second processed data stream, including the accumulation of performance data packets generated by the data agent, to a media agent component of the storage management system, wherein the media agent executes on a secondary storage computing device, which comprises one or more processors and computer-readable memory; and generating, by the media agent, a performance report for the data stream, based at least in part on parsing the first performance data packets and the second performance data packets received from the data agent. The above-recited method wherein the performing the first backup process by the data agent further comprises associating each performance metric in the first set with one or more hierarchical indicators based on hierarchical relationships among the in-process tasks of the first backup process; and wherein the performance report depicts at least the first set of performance metrics and hierarchical relationships therebetween based on the respective associated hierarchical indicators.

According to another illustrative embodiment, a method for accumulating performance metrics in the course of processing a data stream, the method comprising: performing a first process upon the data stream, by a data processing program that executes on a client computing device that comprises one or more processors and computer-readable memory, wherein the data stream comprises first data being processed by the data processing program, and wherein the data stream originates at a first storage device that stores the first data, and wherein performing the first process by the data processing program comprises: computing a first set of performance metrics of in-process tasks of the first process processing the data stream, generating first performance data packets collectively comprising the first set of performance metrics, merging, by the first process: (i) the first performance data packets and (ii) other data packets which result from the processing of the data stream by the first process into (iii) a first processed data stream, and transmitting the first processed data stream to a second process performed by the data processing program; and performing the second process by the data processing program comprising: computing a second set of performance metrics of the second process processing the data stream, generating second performance data packets collectively comprising the second set of performance metrics, integrating, by the second process: (i) the second performance data packets, (ii) the first performance data packets, and (iii) other data packets which result from processing of the first processed data stream by the second process into (iv) a second processed data stream; wherein the second processed data stream comprises an accumulation of performance data packets generated by the data processing program in the course of processing the first data, wherein the accumulation comprises the first performance data packets and the second performance data packets.

The above-recited method may further comprise: generating, by the data processing program, a performance report for the data stream, based at least in part on parsing the first performance data packets and the second performance data packets in the second processed data stream. The above-recited method may further comprise: transmitting the second processed data stream, including the accumulation of performance data packets generated by the data processing program, to a second data processing program, wherein the second data processing program executes on a second computing device, which comprises one or more processors and computer-readable memory; and generating, by the second data processing program, a performance report for the data stream, based at least in part on parsing the first performance data packets and the second performance data packets received from the first data processing program. The above-recited method wherein the performing the first process by the data processing program further comprises associating each performance metric in the first set with one or more hierarchical indicators based on hierarchical relationships among the in-process tasks of the first process; and wherein the performance report depicts at least the first set of performance metrics and hierarchical relationships therebetween based on the respective associated hierarchical indicators.

In other embodiments, a system or systems may operate according to one or more of the methods recited in the preceding paragraphs. In yet other embodiments, a method or methods may operate according to one or more of the systems recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A storage management system for accumulating in-process performance metrics of processes that generate a backup data stream into the backup data stream, the system comprising:
    a first computing device comprising one or more hardware processors and computer memory;
    wherein while executing a data agent, the first computing device is configured to: perform a first backup process upon a data stream that comprises first data being backed up from a first storage device;
    wherein the first backup process comprises:
    tracking in-process tasks of the first backup process and hierarchical relationships among the in-process tasks,
    computing a first set of performance metrics of the tracked in-process tasks of the first backup process processing the data stream,
    generating first performance data packets that comprise: (a) the first set of performance metrics and (b) indicators of the hierarchical relationships among the tracked in-process tasks, and
    merging into the data stream: (i) the first performance data packets and (ii) data packets that result from processing of the data stream by the first backup process; and
    wherein the data agent is further configured to: after the first backup process, perform a second backup process upon the data stream, wherein the second backup process comprises further merging into the data stream: (iii) second performance data packets comprising a second set of performance metrics of the second backup process which processes the data stream as received from the first backup process,
    wherein after the second backup process the data stream comprises in-process performance data packets for the first backup process, and further comprises in-process performance data packets for the second backup process, and further comprises data packets resulting from the first backup process and the second backup process processing the first data being backed up.

2. The storage management system of claim 1, wherein while executing the data agent, the first computing device is further configured to:
    transmit the data stream, which comprises (A) the first performance data packets, (B) the second performance data packets, and (C) the data packets resulting from the first backup process and the second backup process processing the first data being backed up, to a media agent component of the storage management system,
    wherein the media agent executes on a second computing device that comprises one or more hardware processors and computer memory.

3. The storage management system of claim 2, wherein while executing the media agent, the second computing device is configured to:
    parse the data stream to generate a secondary copy of the first data being backed up; and
    generate a performance report for the data stream based on parsing the first performance data packets and the second performance data packets received in the data stream from the data agent.

4. The storage management system of claim 1, wherein a second computing device, which executes a media agent that receives the data stream from the data agent, is configured to: generate a secondary copy of the first data being backed up; and
    generate a performance report for the data stream based on parsing the first performance data packets and the second performance data packets received in the data stream from the data agent.

5. The storage management system of claim 4, wherein while executing the media agent, the second computing device is configured to store the performance report to a performance data log associated with the media agent.

6. The storage management system of claim 4, wherein based on parsing the indicators of the hierarchical relationships among the tracked in-process tasks associated with the first set of performance metrics, the performance report depicts parent-child relationships between in-process tasks performed by the data agent.

7. The storage management system of claim 1, wherein the first backup process further comprises associating each performance metric in the first set with one or more of the indicators of the hierarchical relationships among the tracked in-process tasks.

8. The storage management system of claim 1, wherein the first backup process further comprises associating each performance metric in the first set with one or more of the indicators of the hierarchical relationships among the tracked in-process tasks; and
wherein a second computing device, which executes a media agent that receives the data stream from the data agent is configured to: generate a performance report for the data stream based on parsing the first performance data packets and the second performance data packets received from the data agent, and wherein the performance report depicts at least some hierarchical relationships among the performance metrics based on the indicators of the hierarchical relationships among the tracked in-process tasks.

9. A method for accumulating performance metrics of processes that generate a backup data stream into the backup data stream in a storage management system, the method comprising:
by a media agent component of the storage management system, receiving a data stream from a data agent,
wherein the media agent executes on a computing device, which comprises one or more hardware processors and computer memory, and
wherein the data stream comprises first data being backed up to a storage device in communication with the computing device, and wherein the data stream further comprises first performance data packets comprising measures of performance of backup processes performed upon the data stream by the data agent;
performing, by the media agent upon the data stream a first backup process that comprises:
tracking in-process tasks of the first backup process and hierarchical relationships among the in-process tasks,
generating second performance data packets comprising:
(a) measures of performance of the in-process tasks of the first backup process, and (b) based on the hierarchical relationships among the in-process tasks of the first backup process, hierarchical indicators associated with the in-process tasks of the first backup process, and
merging the second performance data packets into the data stream;
by the media agent, generating a secondary copy of the first data, based on parsing data packets which result from processing of the data stream by the first backup process at the media agent; and
by the media agent, generating a performance report for the data stream based at least in part on parsing the first performance data packets and the second performance data packets in the data stream.

10. The method of claim 9, wherein the performance report indicates at least some of the hierarchical relationships among the in-process tasks of the first backup process.

11. The method of claim 9, wherein the performance report indicates at least some of the hierarchical relationships among the in-process tasks of the first backup process, including parent-child relationships between in-process tasks performed by the first backup process at the media agent.

12. A system for accumulating, into data streams that carry data to be backed up into secondary copies, in-process measures of performance of processes that generate the data streams, the system comprising:
a first computing device that comprises one or more hardware processors and computer memory;
a second computing device that comprises one or more hardware processors and computer memory;
wherein while executing a data agent, the first computing device is configured to:
initiate a data stream from a first storage device which comprises first data to be backed up to a secondary copy,
process the data stream using successive first backup processes for generating the secondary copy,
after a given one of the first backup processes:
(a) measure performance characteristics of the given first backup process, resulting in first performance data packets, and
(b) add the first performance data packets into the data stream, and
transmit the data stream, comprising the first data as processed by the data agent and further comprising the first performance data packets, to a media agent that executes at the second computing device;
wherein while executing the media agent, the second computing device is configured to:
process the data stream as received from the data agent using successive second backup processes for generating the secondary copy,
after a given one of the second backup processes:
(i) measure performance characteristics of the given second backup process, resulting in second performance data packets, and
(ii) add the second performance data packets into the data stream; and
wherein while executing the media agent, the second computing device is further configured to:
parse the data stream, comprising the first data as processed by the data agent and by the media agent and further comprising the first performance data packets and the second performance data packets added into the data stream,
store to a second storage device the secondary copy comprising the first data parsed from the data stream, and
analyze the first performance data packets and the second performance data packets in the data stream to generate a performance report for the data stream.

13. The system of claim 12, wherein the first performance data packets comprise performance characteristics of subtending tasks of the given first backup process at the data agent.

14. The system of claim 12, wherein performance characteristics of subtending tasks of the given first backup process are also measured and results are incorporated into the first performance data packets.

15. The system of claim 12, wherein the second performance data packets comprise performance characteristics of subtending tasks of the given second backup process at the media agent.

16. The system of claim 12, wherein performance characteristics of subtending tasks of the given second backup process are also measured and results are incorporated into the second performance data packets.

17. The system of claim 12, wherein while executing the data agent, the first computing device is further configured to:
- generate one or more indicators of hierarchical relationships among the given first backup process and subtending tasks thereof, and
- incorporate the one or more indicators into the first performance data packets generated by the data agent; and
- wherein the performance report depicts the hierarchical relationships based on the first performance data packets.

18. The system of claim 12, wherein while executing the media agent, the second computing device is further configured to:
- generate one or more indicators of hierarchical relationships among the given second backup process and subtending tasks thereof, and
- incorporate the one or more indicators into the second performance data packets generated by the media agent; and
- wherein the performance report depicts the hierarchical relationships based on the second performance data packets.

19. The system of claim 12, wherein the first performance data packets comprise performance characteristics of subtending tasks of the given first backup process; and
- wherein the performance report depicts the performance characteristics of the subtending tasks of the given first backup process, based on parsing hierarchical indicators for the subtending tasks found in the first performance data packets, such that the performance report depicts parent-child relationships within the given first backup process at the data agent.

20. The system of claim 12, wherein the second performance data packets comprise performance characteristics of subtending tasks of the given second backup process at the media agent; and
- wherein the performance report depicts the performance characteristics of the subtending tasks of the given second backup process found in the second performance data packets, based on parsing hierarchical indicators for the subtending tasks, such that the performance report depicts parent-child relationships within the given second backup process at the media agent.

* * * * *